(12) United States Patent
Carlson et al.

(10) Patent No.: US 9,410,629 B2
(45) Date of Patent: Aug. 9, 2016

(54) VEHICLE VENT VALVE ASSEMBLY

(75) Inventors: Daniel D. Carlson, Fenton, MI (US); J. Michael Andrews, Plymouth, MI (US)

(73) Assignee: Illinois Tool Works, Inc., Glenview, IL (US)

( * ) Notice: Subject to any disclaimer, the term of this patent is extended or adjusted under 35 U.S.C. 154(b) by 758 days.

(21) Appl. No.: 13/255,538

(22) PCT Filed: Mar. 12, 2010

(86) PCT No.: PCT/US2010/027168
§ 371 (c)(1),
(2), (4) Date: Sep. 9, 2011

(87) PCT Pub. No.: WO2010/105176
PCT Pub. Date: Sep. 16, 2010

(65) Prior Publication Data
US 2012/0003907 A1   Jan. 5, 2012

Related U.S. Application Data

(60) Provisional application No. 61/210,120, filed on Mar. 13, 2009.

(51) Int. Cl.
*B24D 13/00* (2006.01)
*B60H 1/00* (2006.01)
(Continued)

(52) U.S. Cl.
CPC ............ *F16K 1/465* (2013.01); *B60H 1/00735* (2013.01); *B60H 1/00835* (2013.01); *B60H 1/248* (2013.01); *F16K 15/03* (2013.01); *F16K 24/04* (2013.01)

(58) Field of Classification Search
CPC ................................. B60H 1/248; B60H 1/249
USPC ............. 454/69–76, 105, 158, 238, 255, 103, 454/156, 162, 159, 164, 251, 340, 112, 136, 454/141, 144, 150–155, 161, 165, 229, 341, 454/359, 79, 99
See application file for complete search history.

(56) References Cited

U.S. PATENT DOCUMENTS 2,512,505 A * 6/1950 Rowe ....................... H01H 9/22
200/43.14
2,573,419 A * 10/1951 Emery ................... B60H 1/248
137/343
(Continued)

FOREIGN PATENT DOCUMENTS

| KR | 10-0482508 B1 | 2/1991 |
| KR | 10-0461063 B1 | 12/2004 |
| KR | 10-2007-0059712 A | 6/2007 |

*Primary Examiner* — Steven B McAllister
*Assistant Examiner* — Jonathan Cotov

(57) ABSTRACT

An apparatus includes a vent valve movable between a closed condition blocking air flow through a vent opening and an open condition enabling air flow through the vent opening. A door position sensor assembly is operable from a first condition to a second condition in response to movement of a vehicle door from a closed position to an open position and is operable from the second condition to the first condition in response to movement of the vehicle door from the open position to the closed position. An actuator assembly operates the vent valve from the closed condition to the open condition upon operation of the door position sensor assembly from the first condition to the second condition and releases the vent valve for movement from the open condition to the closed condition upon operation of the door position sensor assembly from the second condition to the first condition.

28 Claims, 18 Drawing Sheets

(51) Int. Cl.
  *B61D 27/00* (2006.01)
  *F16K 1/46* (2006.01)
  *B60H 1/24* (2006.01)
  *F16K 15/03* (2006.01)
  *F16K 24/04* (2006.01)

(56) References Cited

U.S. PATENT DOCUMENTS

| | | | | |
|---|---|---|---|---|
| 3,066,371 A * | 12/1962 | Muliens | ............... | F16G 11/10 294/74 |
| 3,330,199 A * | 7/1967 | Campbell | ............... | B60H 1/248 454/75 |
| 3,391,628 A * | 7/1968 | Ziegenfelder | ........ | B60H 1/248 454/164 |
| 3,392,654 A * | 7/1968 | Grenier | ............... | B60H 1/248 454/162 |
| 3,525,296 A * | 8/1970 | Haapanen | ............ | B60H 1/248 454/340 |
| 3,683,786 A * | 8/1972 | Hedrick | ............... | F24F 13/15 454/313 |
| 3,750,555 A * | 8/1973 | Gotz | ............... | B60H 1/248 454/75 |
| 4,294,169 A * | 10/1981 | Baird | ............... | 100/48 |
| 4,462,303 A * | 7/1984 | Gebhard | ............... | B60H 1/248 454/134 |
| 4,972,765 A * | 11/1990 | Dixon | ............... | B60H 1/248 137/855 |
| 4,989,499 A * | 2/1991 | Scoccia | ............... | B60H 1/247 454/70 |
| 5,040,455 A * | 8/1991 | Doi | ............... | B60H 1/00428 454/162 |
| 5,048,552 A * | 9/1991 | Bourne | ............... | 137/39 |
| 5,106,052 A * | 4/1992 | Datta | ............... | F16K 1/24 251/229 |
| 5,205,781 A * | 4/1993 | Kanno | ............... | B60H 1/00428 454/141 |
| 5,433,660 A * | 7/1995 | Ohba | ............... | B60H 1/00428 454/141 |
| 5,727,999 A * | 3/1998 | Lewis | ............... | B60H 1/249 137/527.8 |
| 5,842,503 A * | 12/1998 | Foley | ............... | B60H 1/249 137/512.4 |
| 5,927,895 A * | 7/1999 | Watanabe | ............... | F16B 45/02 24/669 |
| 5,983,745 A * | 11/1999 | Petrak | ............... | B60T 7/08 188/2 D |
| 6,031,226 A * | 2/2000 | Parekh | ............... | B60H 1/00857 251/250.5 |
| 6,036,593 A * | 3/2000 | Koerber | ............... | B60H 1/00857 292/266 |
| 6,189,406 B1 * | 2/2001 | Kapes | ............... | E05F 15/695 29/434 |
| 6,264,257 B1 * | 7/2001 | Meinke | ............... | E05B 85/10 292/336.3 |
| 6,409,591 B1 * | 6/2002 | Sullivan | ............... | B60H 1/249 137/512.1 |
| 6,474,190 B1 * | 11/2002 | Choo | ............... | E05B 83/24 292/336.3 |
| 6,515,378 B2 * | 2/2003 | Drummond et al. | ......... | 307/10.1 |
| 6,776,554 B2 * | 8/2004 | Acciacca | ............... | E05B 83/16 292/225 |
| 6,904,348 B2 * | 6/2005 | Drummond et al. | ............ | 701/49 |
| 7,077,742 B2 * | 7/2006 | Stevenson | ............... | B60H 1/249 454/259 |
| 7,589,431 B2 * | 9/2009 | Hentsch et al. | ............... | 307/10.1 |
| 7,705,722 B2 * | 4/2010 | Shoemaker | ............ | B60H 1/249 296/147 |
| 7,832,762 B2 * | 11/2010 | Breed | ............... | B60R 21/013 280/728.1 |
| 8,274,383 B2 * | 9/2012 | Mitchell | ............... | G07C 5/08 180/207.1 |
| 8,453,907 B2 * | 6/2013 | Laurent et al. | ............ | 227/176.1 |
| 2005/0199845 A1 * | 9/2005 | Jones | ............... | F16K 15/031 251/129.06 |
| 2008/0014856 A1 * | 1/2008 | Voit | ............... | B60H 1/00378 454/158 |
| 2009/0088065 A1 * | 4/2009 | Mouch | ............... | B60H 1/248 454/164 |
| 2009/0280736 A1 * | 11/2009 | Schneider | ............... | B60H 1/249 454/162 |
| 2010/0099346 A1 * | 4/2010 | Browne | ............... | F16K 17/003 454/70 |
| 2010/0216384 A1 * | 8/2010 | McCarthy | ............... | B60H 1/249 454/70 |
| 2013/0267159 A1 * | 10/2013 | McCarthy | ............... | B60H 1/249 454/162 |
| 2013/0309956 A1 * | 11/2013 | Mouch | ............... | B60H 1/249 454/165 |

* cited by examiner

VEHICLE VENT VALVE ASSEMBLY

RELATED APPLICATIONS

This application corresponds to PCT/US2010/027168, filed Mar. 12, 2010, which claims the benefit of U.S. Provisional Application Ser. No. 61/210,120, filed Mar. 13, 2009, the subject matter of which is incorporated herein by reference in their entirety.

TECHNICAL FIELD

The present invention relates to a vent valve which is utilized to prevent increases in air pressure in a passenger compartment in a vehicle.

BACKGROUND OF THE INVENTION

In the past, pressure relief valves have been provided for relieving air pressure in a passenger compartment of a vehicle. One known pressure relief valve is opened when a differential in air pressure is established between the passenger compartment of the vehicle and atmosphere. For example, when a vehicle door is slammed closed, the air pressure within the passenger compartment is likely to increase suddenly. In response to an increase in air pressure with closing of a passenger door, the known pressure relief valve is opened to relieve the pressure within the passenger compartment. Known pressure relief valves which have been utilized to relieve pressure in the passenger compartment of a vehicle are disclosed in U.S. Pat. Nos. 7,182,093 and 7,302,962.

SUMMARY OF THE INVENTION

The present invention provides an improved vent valve assembly which is utilized to prevent occurrence of excessive air pressure in a passenger compartment of a vehicle. The vent valve assembly includes a vent valve and an actuator assembly. The actuator assembly is operable to effect movement of the vent valve from a closed position to an open position before excessive fluid pressure can occur in the passenger compartment of the vehicle.

The actuator assembly may be connected with the vent valve in a manner which enables relative movement to occur between the vent valve and the actuator assembly. This enables the vent valve to remain at least partially open after operation of the actuator assembly to release the vent valve for closing. A damper may be provided to delay closing of the vent valve.

The present invention includes a plurality of features which may be utilized together as disclosed herein. Alternatively, these features may be used separately and/or in various combinations with features from the prior art.

BRIEF DESCRIPTION OF THE DRAWINGS

The foregoing and other features of the invention will become more apparent upon a consideration of the following description taken in connection with the accompanying drawings wherein.

DESCRIPTION OF PREFERRED EMBODIMENTS

General Description

Figure 1:
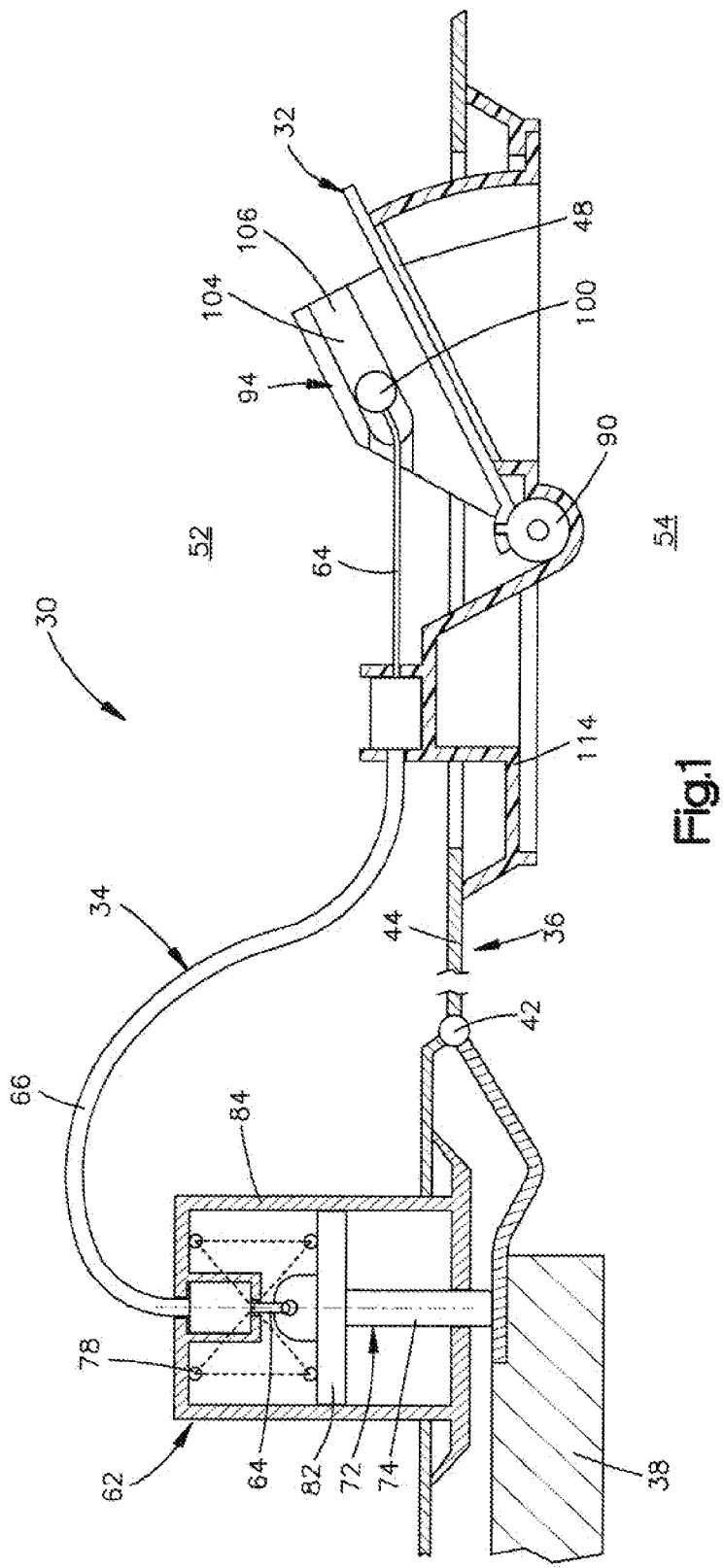
FIG. 1 is a schematic illustration of a vent valve assembly constructed in accordance with the present invention, a vent valve in the vent valve assembly being illustrated in a closed condition blocking flow of air from a passenger compartment of a vehicle when a vehicle door is in a closed position.

A vent valve assembly 30, constructed in accordance with the present invention, is illustrated schematically in FIG. 1 in a closed condition. The vent valve assembly 30 includes a vent valve 32 and an actuator assembly 34. The vent valve assembly 30 is disposed in a vehicle, indicated schematically at 36 in FIG. 1. The vent valve 32 may be disposed at any desired location in the vehicle 36.

Figure 2:
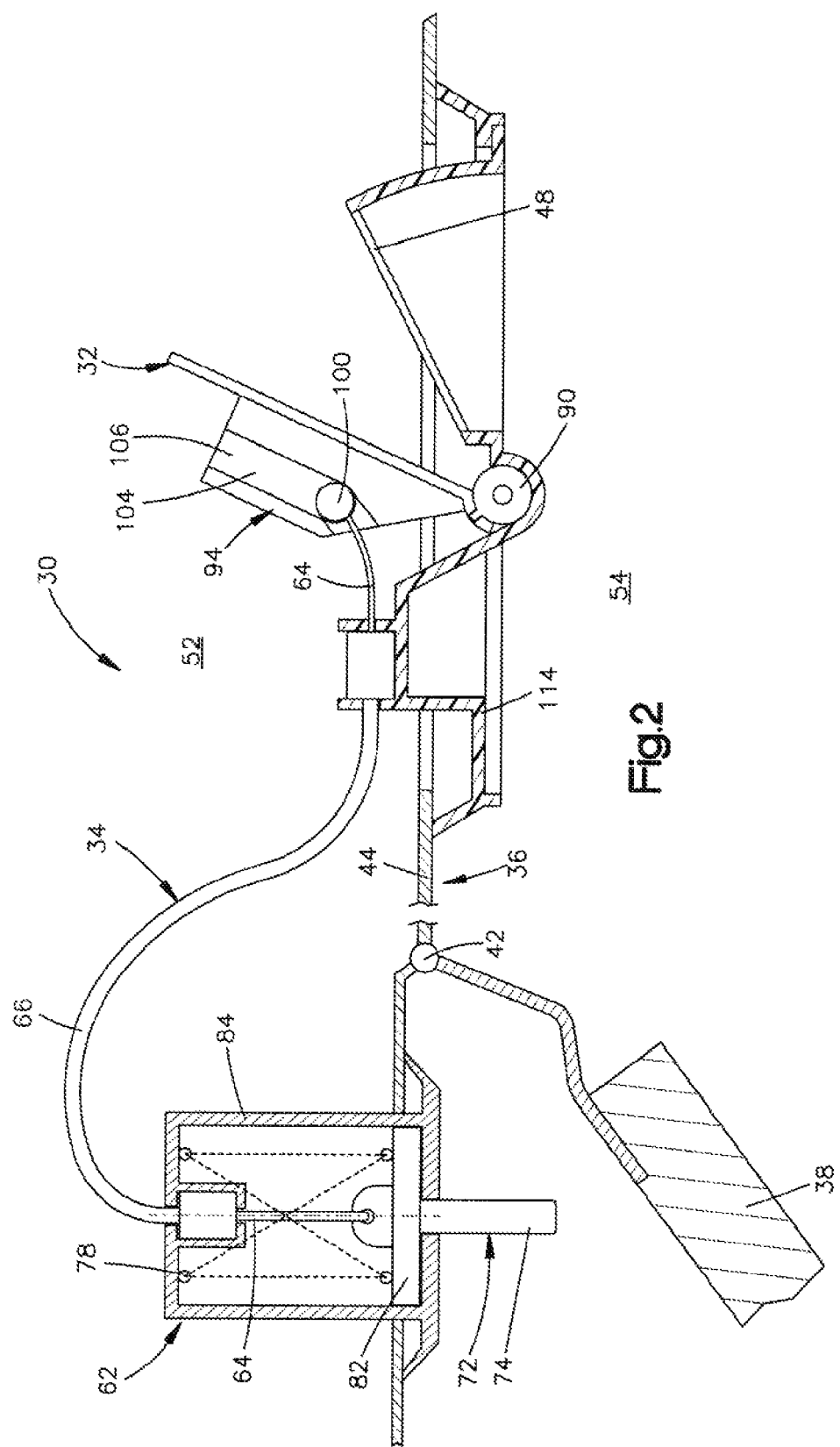
FIG. 2 is a schematic illustration, generally similar to FIG. 1, illustrating the vent valve assembly in an open condition in which the vent valve is ineffective to block a flow of air when the vehicle door is in an open position.

The actuator assembly 34 effects operation of the vent valve 32 from the closed condition of FIG. 1 to the open condition of FIG. 2 upon movement of a door 38 of the vehicle from the closed position illustrated schematically in FIG. 1 to the open position illustrated schematically in FIG. 2. The door 38 may be any desired door of the vehicle. If desired, the vent valve 32 may be operated to an open condition upon operation of any selected component of the vehicle 36.

When the door 38 of the vehicle 36 is moved from the closed position of FIG. 1 to the open position of FIG. 2, the door pivots about a hinge 42 which interconnects the door and a body 44 of the vehicle. As this occurs, the actuator assembly 34 effects operation of the vent valve 32 from the closed condition of FIG. 1 to the open condition of FIG. 2. When the vent valve 32 is in the closed condition of FIG. 1, the vent valve blocks a vent opening 48. When the vent valve 32 is in the open condition of FIG. 2, the vent valve is ineffective to block the vent opening 48.

When the vent valve 32 is in the open condition of FIG. 2, air can flow between the interior of a passenger compartment 52 of the vehicle 36 and the atmosphere. If desired, the air may flow from the passenger compartment 52 and/or trunk compartment 54 to atmosphere around the outside of the vehicle 36. Since air can pass freely through the vent opening 48 when the vent valve 32 is in the open condition of FIG. 2, the air pressure in the interior 52 of the vehicle tends to equal the air pressure in the trunk compartment 54 and/or atmosphere around the vehicle.

Figure 3:
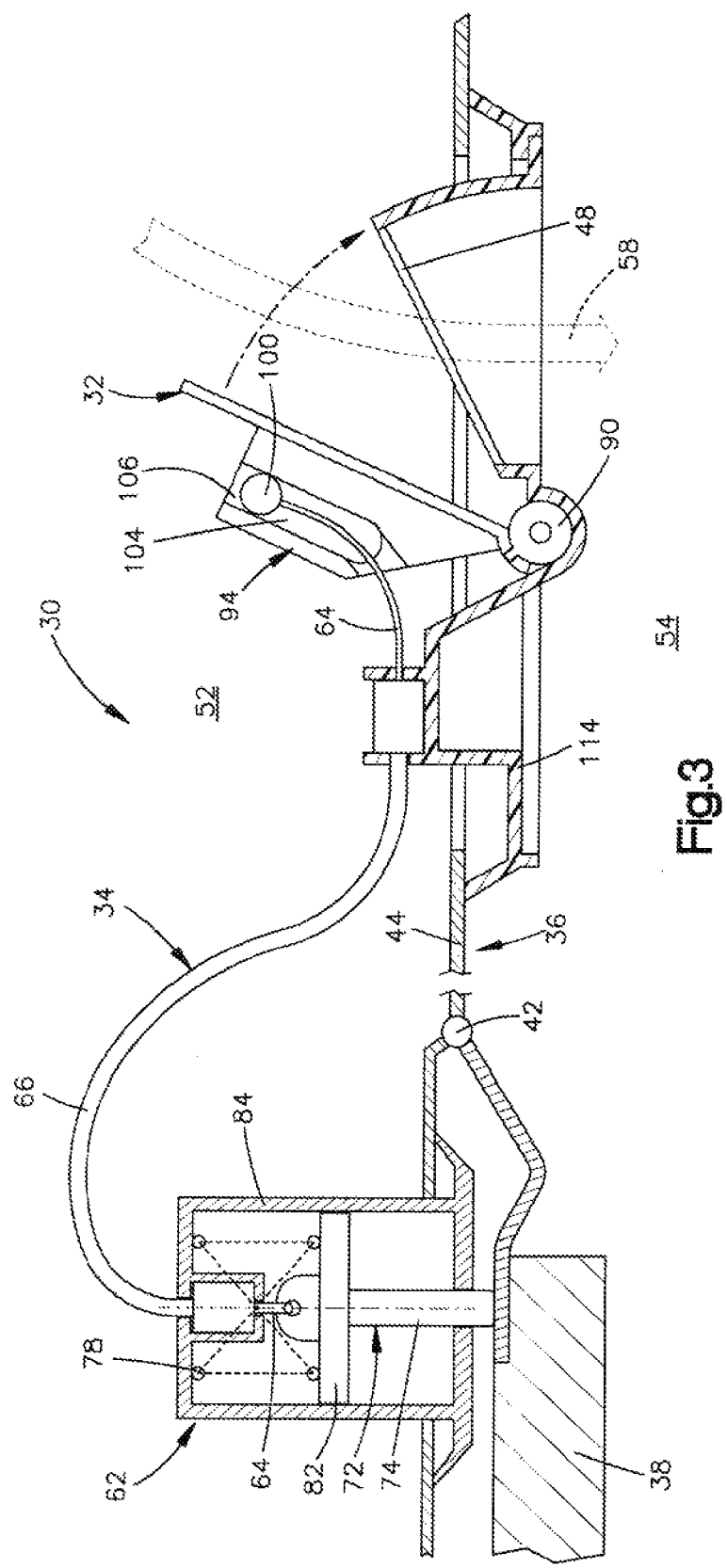
FIG. 3 is a schematic illustration, generally similar to FIG. 2, illustrating the vent valve in an open condition and the vehicle door in the closed position.

When the vehicle door 38 is moved from the open position of FIG. 2 to the closed position of FIG. 3, the door pivots about the hinge 42. This pivotal movement tends to induce a flow of air into the passenger compartment 52 of the vehicle 36. In the absence of the vent valve assembly 30, the fluid pressure, that is, air pressure, in the passenger compartment 52 of a vehicle tends to increase as the vehicle door 38 is closed. However, when the vent valve 32 is in the open condition illustrated in FIGS. 2 and 3, air can flow from the passenger compartment 52 of the vehicle through the vent opening 48, in the manner indicated schematically by an arrow 58 in FIG. 3.

The flow of air from the passenger compartment 52 of the vehicle 36 through the vent opening 48 to atmosphere prevents any significant increase in the fluid air pressure within the passenger compartment as the door 38 closes. This enables the door 38 to be easily and quietly closed. Since the vent valve 32 moves to and is maintained in the open condition of FIGS. 2 and 3 prior to and shortly after closing of the door 38, the vent valve assembly 30 is effective to prevent the occurrence of a significant increase in the fluid pressure in the passenger compartment 52 of the vehicle as the door 38 is closed. A short time after the door 38 has closed, the vent valve 32 moves from the open condition of FIGS. 2 and 3 back to the closed condition of FIG. 1.

Actuator Assembly

The actuator assembly 34 includes a door position sensor assembly 62 (FIGS. 1-3, 6 and 7). The door position sensor assembly 62 is actuated upon movement of the door 38 between its closed position (FIG. 1) and its open position (FIG. 2). The door position sensor assembly 62 is connected with the vent valve 32 (FIGS. 1-4) by a force transmitting member 64. The illustrated force transmitting member 64 is a flexible wire or cable which is enclosed by a flexible sheath 66. The force transmitting member 64 and sheath 66 may be referred to as a Bowden cable. However, it should be understood that the force transmitting member 64 may have a different construction if desired.

The left (as viewed in FIGS. 1-3) end portion of the force transmitting member 64 is connected with a plunger 72 in the door position sensor assembly 62. The plunger 72 has a cylindrical end or nose section 74 which engages the door 38 when the door is in the closed condition of FIG. 1. The end section 74 is pressed against the door 38 by a relatively strong biasing spring 78. The biasing spring 78 applies force against a cylindrical head end portion 82 of the plunger 72.

When the door 38 is in the closed position illustrated in FIG. 1, the plunger 72 is maintained in a retracted condition and the biasing spring is compressed between the head end portion 82 of the plunger 72 and a housing 84 which is connected to the vehicle body 44. When the door 38 is pivoted from the closed position of FIG. 1 to the open position of FIG. 2, the plunger 72 is released for movement under the influence of the biasing spring 78. The biasing spring 78 is effective to move the plunger 72 toward the door 38, that is, in a downward direction (as viewed in FIGS. 1 and 2).

Figure 4:
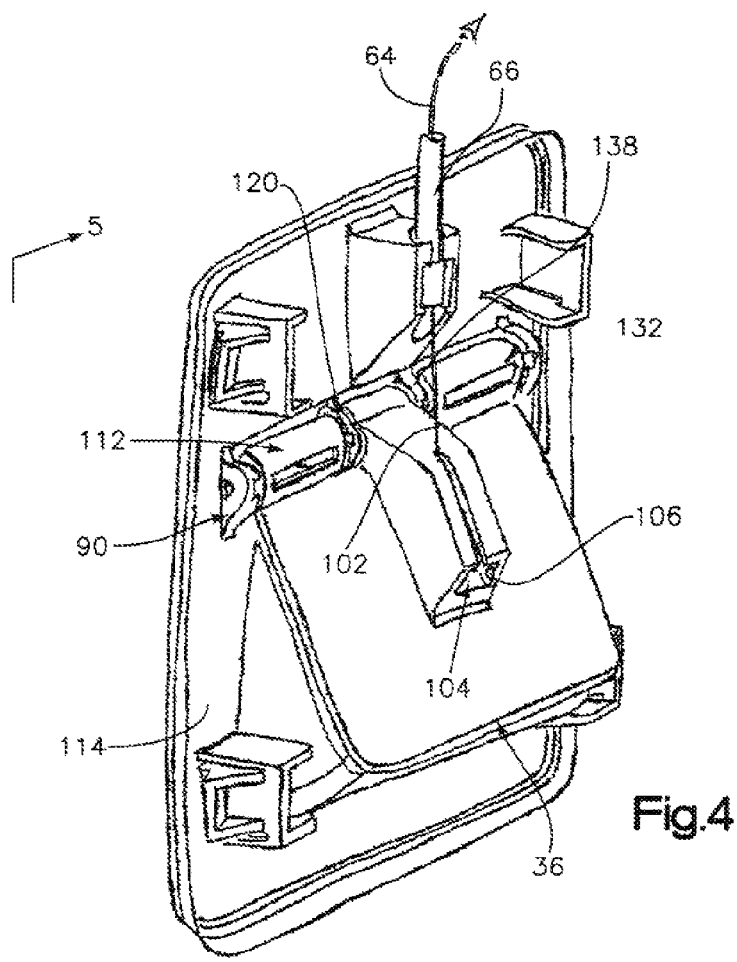
FIG. 4 is a schematic pictorial illustration depicting the manner in which an actuator assembly, damper, and closing spring are connected with the vent valve of FIGS. 1-3.
Figure 5:
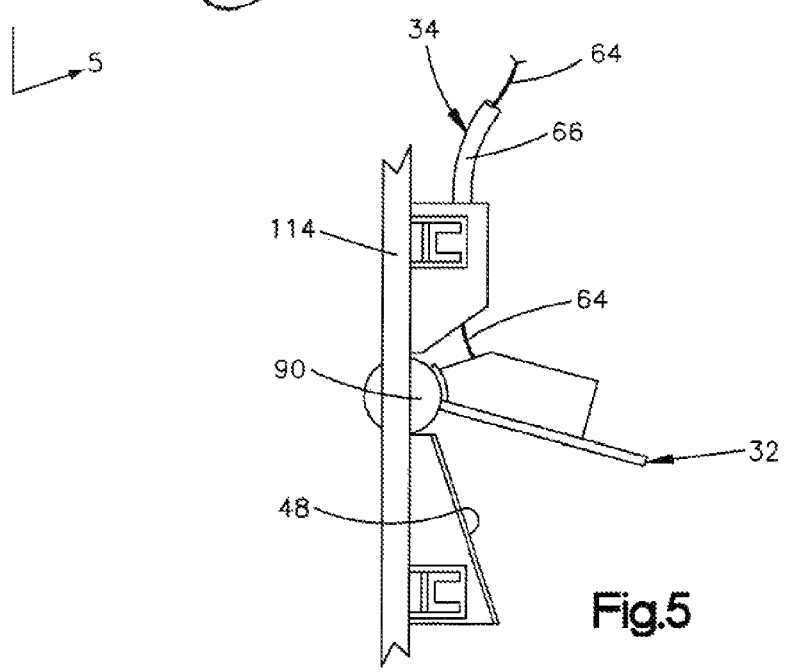
FIG. 5 is a fragmentary schematic side elevational view, taken on a reduced scale along the line 5-5 of FIG. 4, further illustrating the manner in which the vent valve moves between open and closed conditions.
Figure 6:
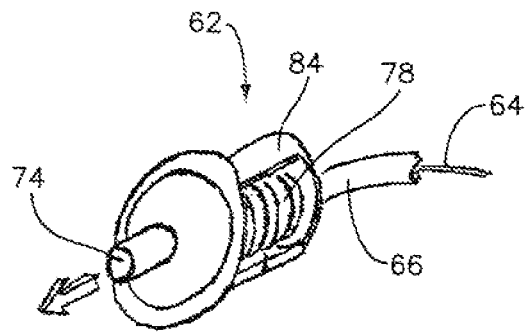
FIG. 6 is a fragmentary schematic illustration depicting the manner in which a force transmitting member is connected with a biasing spring which urges the force transmitting member in a direction to move the vent valve to its open condition.
Figure 7:
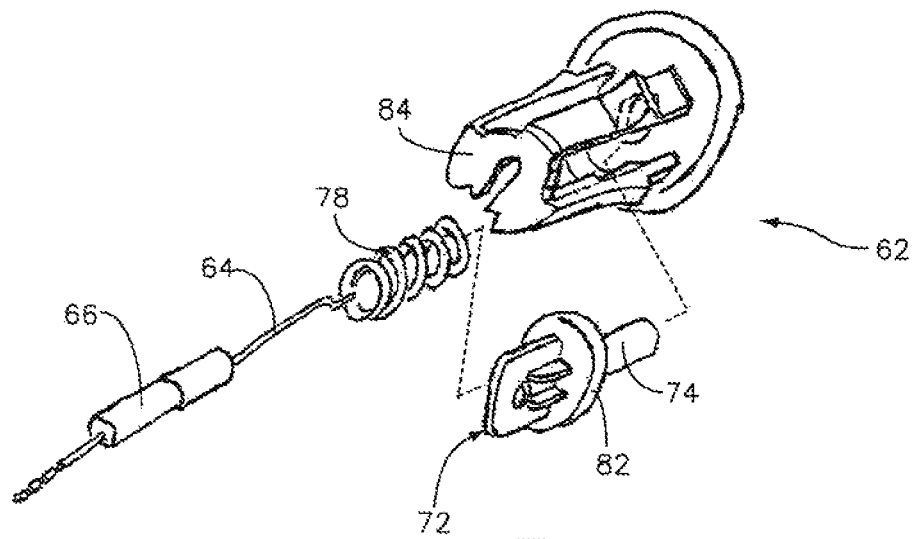
FIG. 7 is an exploded fragmentary schematic illustration of the apparatus of FIG. 6.

As the door 38 opens, force is transmitted from the biasing spring 78 through the head end portion 82 of the plunger 72 to the force transmitting member 64. The force is transmitted through the force transmitting member 64 to the vent valve 32. The force transmitted through the force transmitting member 64 effects pivotal movement of the vent valve 32 in a counterclockwise direction (as viewed in FIG. 1) about a hinge 90 (FIGS. 1 and 4). As this occurs, the vent valve 32 moves to an open condition and connects the passenger compartment 52 in fluid communication with the trunk compartment 54 and/or environment around the vehicle through the vent opening 48.

The force transmitting member 64 is connected with the vent valve 32 by a slide connection 94 which allows relative movement to occur between the force transmitting member and vent valve 32. Thus, the force transmitting member 64 is movable relative to the vent valve 32 from the position illustrated schematically in FIG. 2 to the position illustrated schematically in FIG. 3. This relative movement enables the vent valve 32 to remain in the open condition after the door 38 has moved to its closed condition (FIG. 3).

Figure 8:
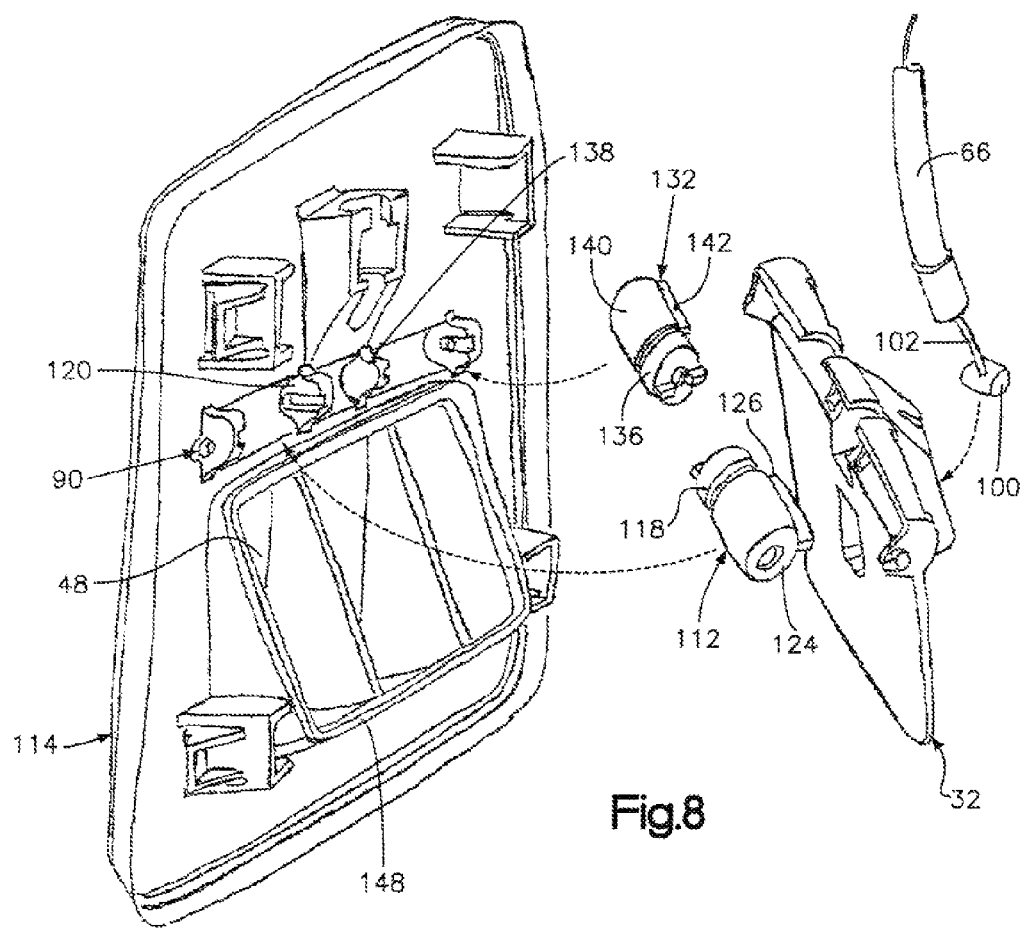
FIG. 8 is an exploded schematic pictorial illustration, generally similar to FIG. 4, illustrating a manner in which the actuator assembly, damper, and closing spring are connected with the vent valve.

The slide connection 94 has a construction which enables the force transmitting member 64 to move relative to the vent valve 32 (FIG. 4). The force transmitting member 64 has a head end section 100 which is attached to an end of a cable or wire 102 (FIG. 8). The generally cylindrical head end section 100 is received in a slot 104 (FIGS. 1-4) connected with the vent valve 32. The slot 104 has a generally rectangular cross sectional configuration (FIG. 4) in which the head end section 100 is received. The head end section 100 can slide along a longitudinal axis of the slot 104.

When the door 38 is in the open condition of FIG. 2 and the vent valve 32 is in the open condition, the head end section 100 of the force transmitting member 64 is disposed in engagement with a left end portion (as viewed in FIGS. 1 and 2) of the slot 104. When the vehicle door 38 is operated from the open position of FIG. 2 to the closed position of FIG. 3, the head end section 100 of the force transmitting member 64 is moved along the slot toward an open end 106 of the slot (FIG. 3). This allows the force transmitting member to be moved relative to the vent valve 32 while the vent valve remains in the open condition.

Closing Spring

A closing spring 112 (FIG. 4) is disposed at the hinge 90 between the vent valve 32 and a stationary base 114. The vent valve 32 is pivotally mounted on the base 114 at the hinge 90. The closing spring 112 is disposed in a coaxial relationship with the hinge 90. The closing spring 112 is weaker than the biasing spring 78 (FIGS. 1 and 2). This enables the biasing spring 78 to provide force which is effective to overcome the closing spring 112 and pivot the vent valve 32 when the vehicle door 38 opens (FIG. 2).

The closing spring 112 has an inner portion or tab 118 (FIG. 8) which engages a slot in tab 120. The tab 120 is fixedly connected with the base 114 and holds the inner portion or tab 118 of the closing spring 112 against rotational movement relative to the base. In addition, the closing spring 112 has an outer portion 124 which extends around and is coaxial with the inner portion 118. The outer portion 124 has a projection or tab 126 which engages the vent valve 32. The tab 126 holds the outer portion 124 against rotation relative to the vent valve 32.

The inner portion 118 and outer portion 124 of the closing spring are interconnected by a resiliently deflectable spring which is enclosed by the outer portion 124. The resiliently deflectable spring applies a force to the outer portion 124 urging the vent valve 32 toward the closed position illustrated in FIG. 4. Upon pivotal movement of the vent valve 32 from the closed position of FIGS. 1 and 4 toward the open position of FIG. 2, under the influence of force transmitted through the force transmitting member 64 to the vent valve 32, the outer portion 124 (FIG. 8) of the closing spring 112 is rotated relative to the inner portion 118 of the closing spring. This results in the spring which interconnects the inner portion 118 and outer portion 124 of the closing spring 112 being resiliently deflected.

The closing spring 112 is weaker than the biasing spring 78 (FIG. 1) in the door position sensor assembly 62. Therefore, when the vehicle door 38 is moved to the open position of FIG. 2, the biasing spring 78 applies sufficient force to the force transmitting member 64 to pivot the vent valve 32 from the closed condition of FIG. 1 to the open condition of FIG. 2 against the influence of the closing spring 112 (FIG. 8). When the door 38 (FIGS. 1-3) of the vehicle is moved from the open position of FIG. 2 to the closed position of FIG. 3 and the force transmitting member 64 is moved relative to the vent valve 32, the vent valve is released for pivotal movement about the hinge 90 under the influence of the closing spring 112.

Friction Damper

A friction damper 132 (FIGS. 4 and 8) is provided to delay movement of the vent valve 32 from the open condition of FIG. 2 to the closed condition of FIG. 1. This results in the vent valve moving relatively slowly from the open condition of FIG. 2, through the partially closed condition of FIG. 3 to the closed condition of FIG. 1 under the influence of the closing spring 112 after the vehicle door 38 has moved from the open position of FIG. 2 to the closed position of FIG. 3. By having the vent valve 32 move relatively slowly from the open condition to the closed condition, any tendency for the air pressure in the passenger compartment 52 of the vehicle to increase as the door 38 is closed is mitigated by a flow of air through the vent opening 48, in the manner indicated by the arrow 58 in FIG. 3.

The resistance provided by the friction damper 132 to closing of the vent valve 32 is eventually overcome by the closing spring 112. When this occurs, the vent valve 32 moves to the closed condition of FIG. 1 with the vehicle door 38 closed. However, the vent valve 32 remains in a partially open condition, such as is shown in FIG. 3, for a sufficient length of time to prevent a significant increase in the air pressure in the passenger compartment 52 of the vehicle 36.

The friction damper 132 (FIG. 8) has an inner portion 136 which is stationary relative to the base 114. The inner portion 136 engages a slot in tab 138 which is fixedly connected to the base 114. The slot in tab 138 holds the inner portion 136 of the damper 132 against movement relative to the base 114.

In addition, the friction damper 132 has an outer portion 140 which moves relative to the base 114 with the vent valve 32. The outer portion 140 of the friction damper 132 has a tab 142 which engages the vent valve 32. The tab 142 holds the outer portion 140 against rotational movement relative to the vent valve 32. The friction damper 132 is disposed in a coaxial relationship with the closing spring 112 and hinge 90, in the manner illustrated schematically in FIG. 4.

The inner portion 136 of the friction damper 132 has a cylindrical outer side surface which is within a cylindrical inner side surface on the outer portion 140 of the friction damper. An O-ring resists relative rotation between the inner and outer portions 136 and 140 of the friction damper. However, the friction force provided by the O-ring between the inner and outer portions 136 and 140 of the friction damper 132 is insufficient to hold the vent valve 32 against relatively slow rotational movement from the open condition of FIG. 2 to the closed condition of FIG. 1 under the influence of the closing spring 112.

When the vehicle door 38 is moved from the open position of FIG. 2 to the closed position of FIG. 1, the plunger 72 compresses the biasing spring 78. As this occurs, the force transmitting member 64 moves the head end section 100 along the slot 104 from the position shown in FIG. 2 through the position shown in FIG. 3. This releases the vent valve 32 for pivotal movement toward the closed condition shown in FIG. 1.

The vent valve 32 is then slowly closed by the closing spring 112 against the influence of the friction damper 132. This results in the vent valve 32 being in the partially open condition, illustrated schematically in FIG. 3, for a short period of time after the door 38 of the vehicle has been moved to its closed position. The vent valve 32 remains in a partially open condition, while the closing spring 112 overcomes the influence of the friction damper 132, for a sufficient length of time to enable air to flow from the passenger compartment 52 of the vehicle 36 through the vent opening 48, in the manner illustrated schematically by the arrow 58 in FIG. 3, without a significant increase in the air pressure in the interior of the vehicle.

Although the friction damper 132 has a generally cylindrical configuration, it is contemplated that the friction damper 132 could be constructed in a different manner if desired. For example, the friction damper 132 may be formed by a pair of flat washers which are pressed against each other and which slide relative to each other during movement of the vent valve 32 from the open position to the closed position.

The closing spring 112 is effective to close the vent valve against the influence of the friction damper 132 after the vehicle door 38 has been moved to the closed position of FIG. 1. The relatively slow closing of the vent valve 32 minimizes any tendency for the vent valve to rebound and/or vibrate as it is closed. To further prevent rebounding and/or vibration of the vent valve 32 as it is closed, a cushion or gasket 148 (FIG. 8) is provided around the periphery of the vent opening 48. The cushion 148 is engaged by a vent valve 32 and cushions closing movement of the vent valve.

When the vent valve 32 is in the closed condition of FIG. 1, the vent valve blocks transmission of air and noise through the vent opening 48. The blockage of the transmission of air and noise through the vent valve 32 is promoted by having the cushion 148 around the periphery of the vent opening 48 and by having the vent valve 32 pressed firmly against the cushion 148 by the closing spring 112. The vent valve 32 has a thickness which is sufficient to impede the transmission of noise through the vent valve.

In one specific embodiment of the invention, the vent valve 32 had a thickness of approximately 1.5 mm. Of course, the vent valve 32 may be formed with either a greater or lesser thickness. In addition, noise insulation material may be provided on the side of the vent valve 32 toward the opening 48 and/or the side of the vent valve away from the opening.

Figure 9:
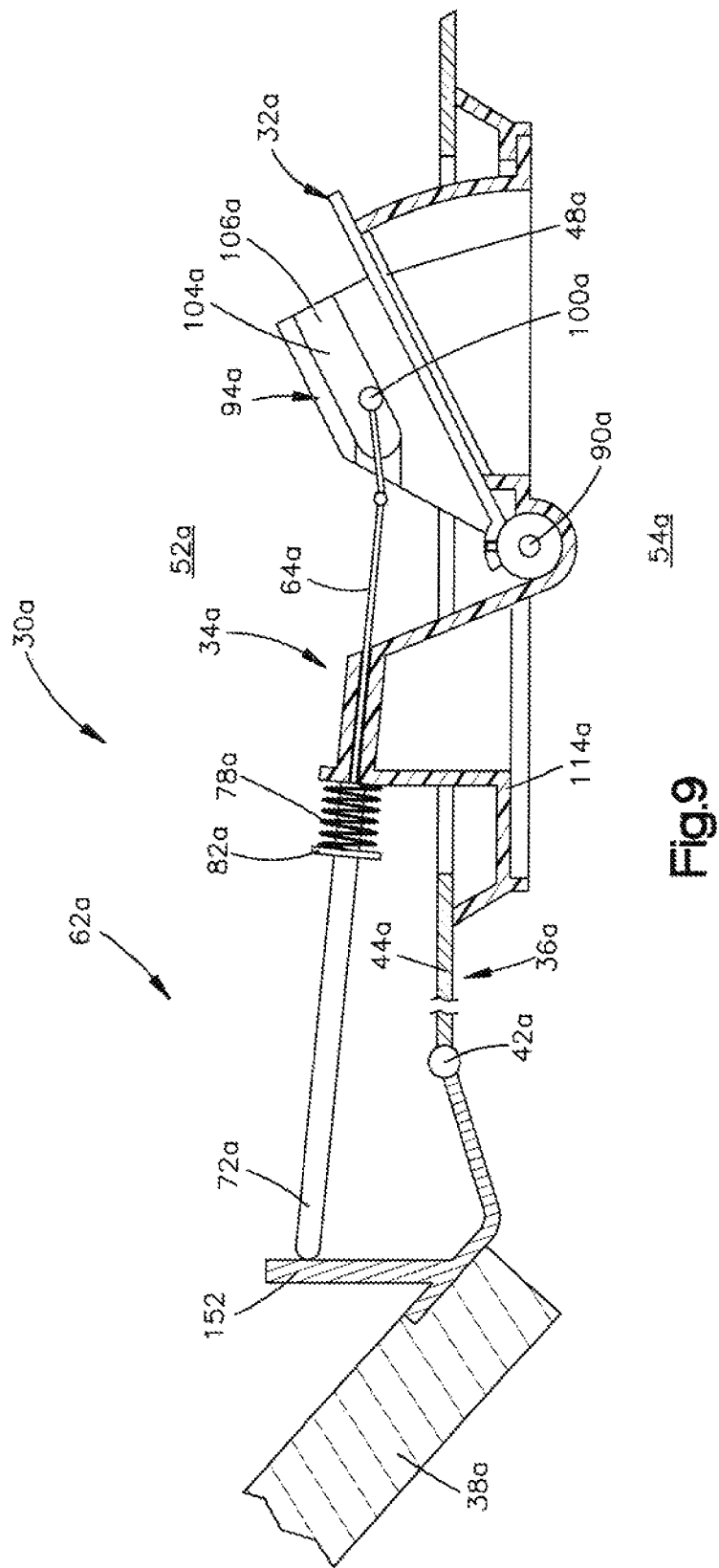
FIG. 9 is a schematic illustration, generally similar to FIG. 1, depicting a second embodiment of the vent valve assembly, the vent valve being illustrated in a closed condition.
Figure 10:
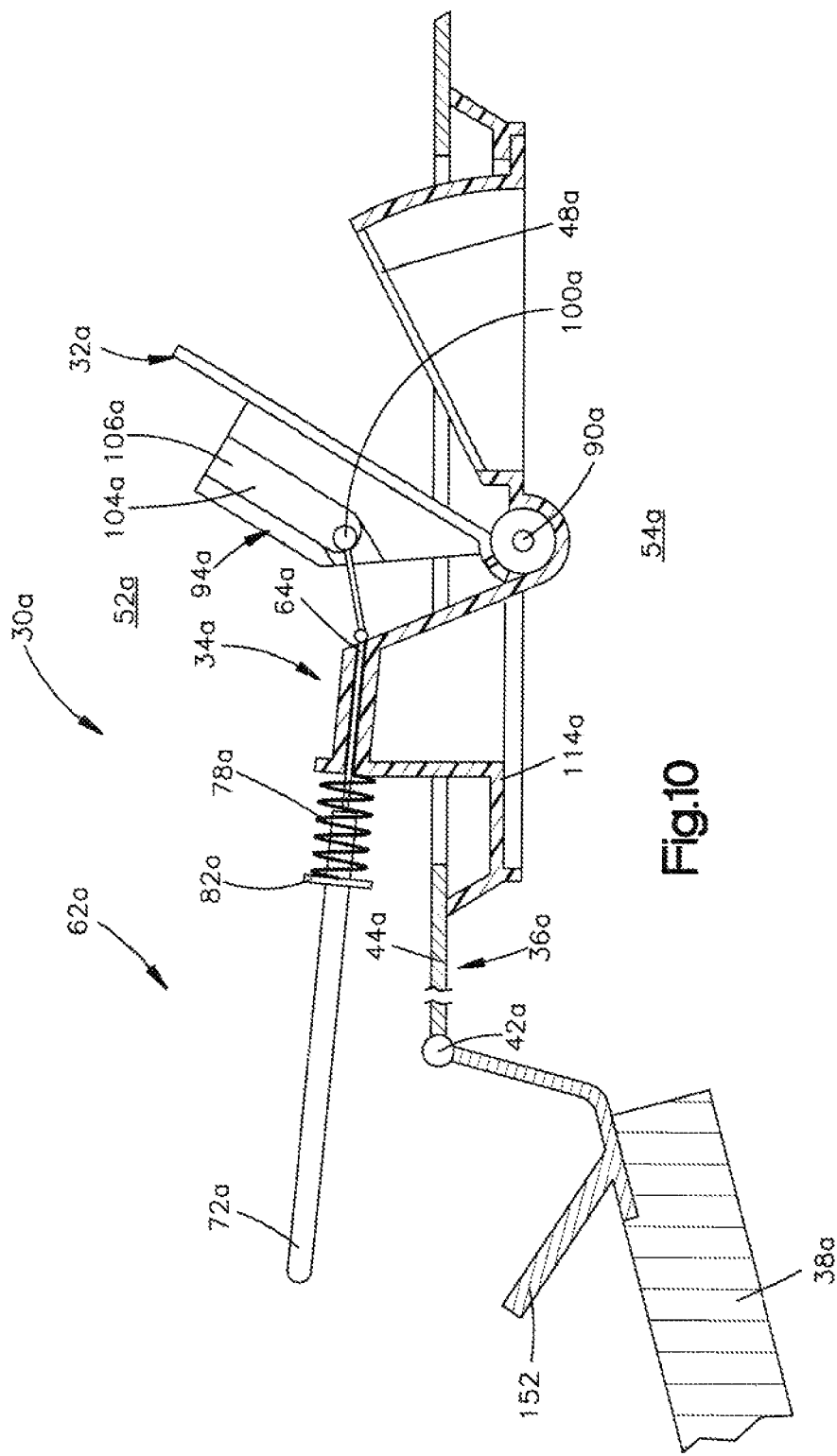
FIG. 10 is a schematic illustration, generally similar to FIG. 2, depicting the vent valve of the embodiment of FIG. 9 in an open condition.
Figure 11:
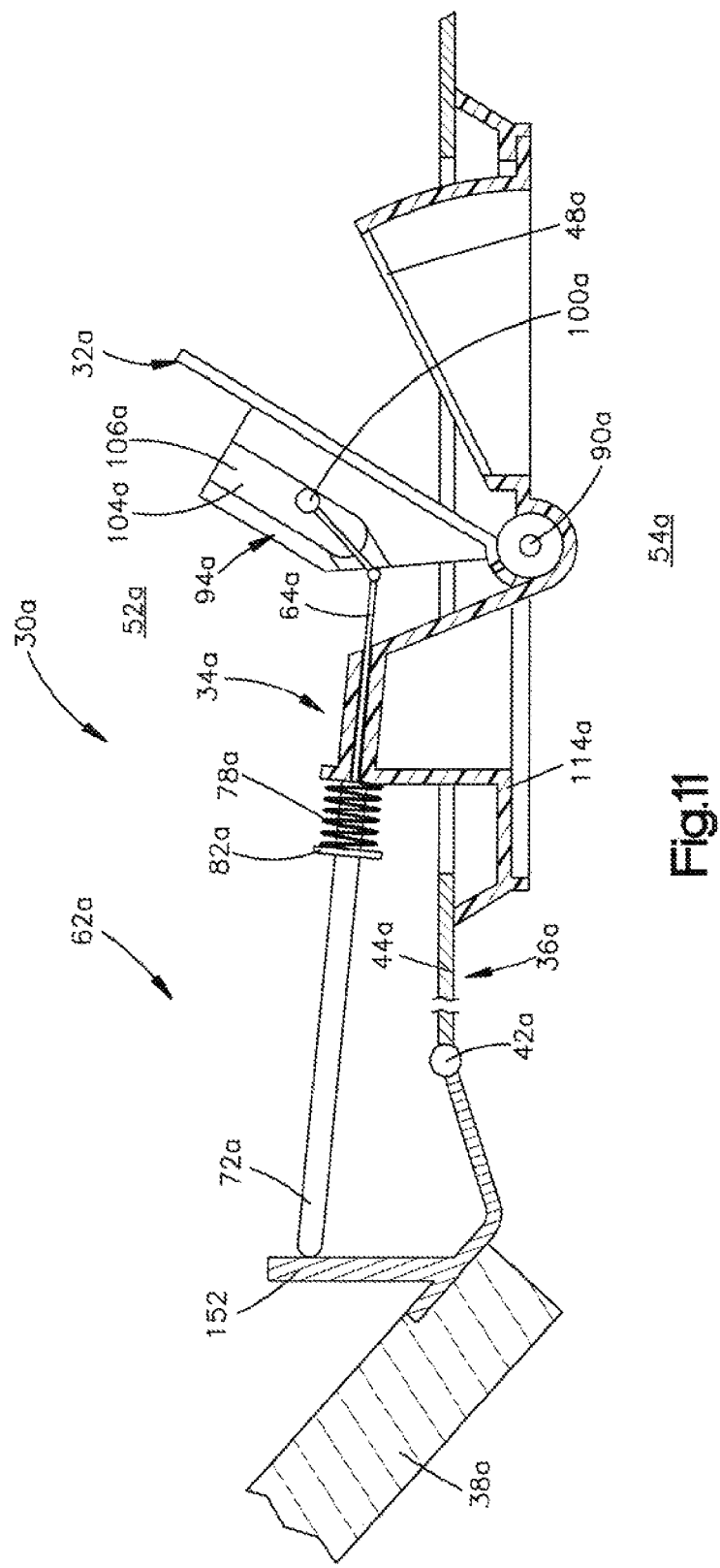
FIG. 11 is a schematic illustration, generally similar to FIG. 3, depicting the vent valve of the embodiment of FIGS. 9 and 10 in an open condition after a vehicle door has been closed.

Embodiment of FIGS. 9-11

In the embodiment of the invention illustrated in FIGS. 1-8, the actuator assembly 34 includes a flexible force transmitting member 64. In the embodiment of the invention illustrated in FIGS. 9-11, the actuator assembly 34 includes a rigid force transmitting member. Since the embodiment of the invention illustrated in FIGS. 9-11 is generally similar to the embodiment of the invention illustrated in FIGS. 1-8, similar numerals will be utilized to designate similar components, the suffix letter "a" being associated with the numerals of FIGS. 9-11.

In the embodiment of the invention illustrated in FIGS. 9-11, the vent valve assembly 32a includes an actuator assembly 34a having a rigid force transmitting member 64a which transmits force between a biasing spring 78a and a vent valve 32a. A slide connection 94a interconnects the force transmitting member 64a and the vent valve 32a. The force transmitting member 64a performs the functions of both the plunger 72 and force transmitting member 64 in the embodiment of the invention illustrated in FIGS. 1-3.

The force transmitting member 64a has a plunger portion 72a which forms part of a door position sensor assembly 62a. The force transmitting member 64a includes a head end section 100a pivotally connected to the plunger portion 72a. The head end section 100a is connected with the vent valve 32a by a slide connection 94a which allows relative movement to occur between the force transmitting member 64a and vent valve 32a. The head end section 100a is received in a slot 104a of the vent valve 32a. The head end section 100a can slide along a longitudinal axis of the slot 104a. Thus, the force transmitting member 64a is movable relative to the vent valve 32a. This relative movement enables the vent valve 32a to remain in the open condition after the door 38a has moved to its closed condition.

The plunger portion 72a of the force transmitting member 64a engages a flange 152 connected with the vehicle door 38a. When the vehicle door 38a is in the closed position of FIG. 9, the flange 152 holds the plunger portion 72a of the force transmitting member 64a in a retracted position. When the force transmitting member 64a is in the retracted position (FIG. 9), a head end portion 82a of the plunger portion 72a holds a biasing spring 78a in a compressed condition. At this time, a closing spring, corresponding to the closing spring 112 of FIGS. 4 and 8, holds the vent valve 32a in the closed condition.

When the door 38a is moved to the open position (FIG. 10), the flange 152 moves away from the plunger portion 72a of the force transmitting member 64a. As this occurs, the biasing spring 78a moves the force transmitting member 64a toward the left (as viewed in FIG. 9) to move the vent valve 32a to the open condition of FIG. 10. When the door 38a is closed (FIG. 11), the force transmitting member moves toward the right (as viewed in FIGS. 10 and 11) to release the vent valve 32a for movement to the closed condition. A friction damper, corresponding to the friction damper 132 of FIGS. 4 and 8, delays movement of the vent valve 32a to the closed condition.

Figure 12:
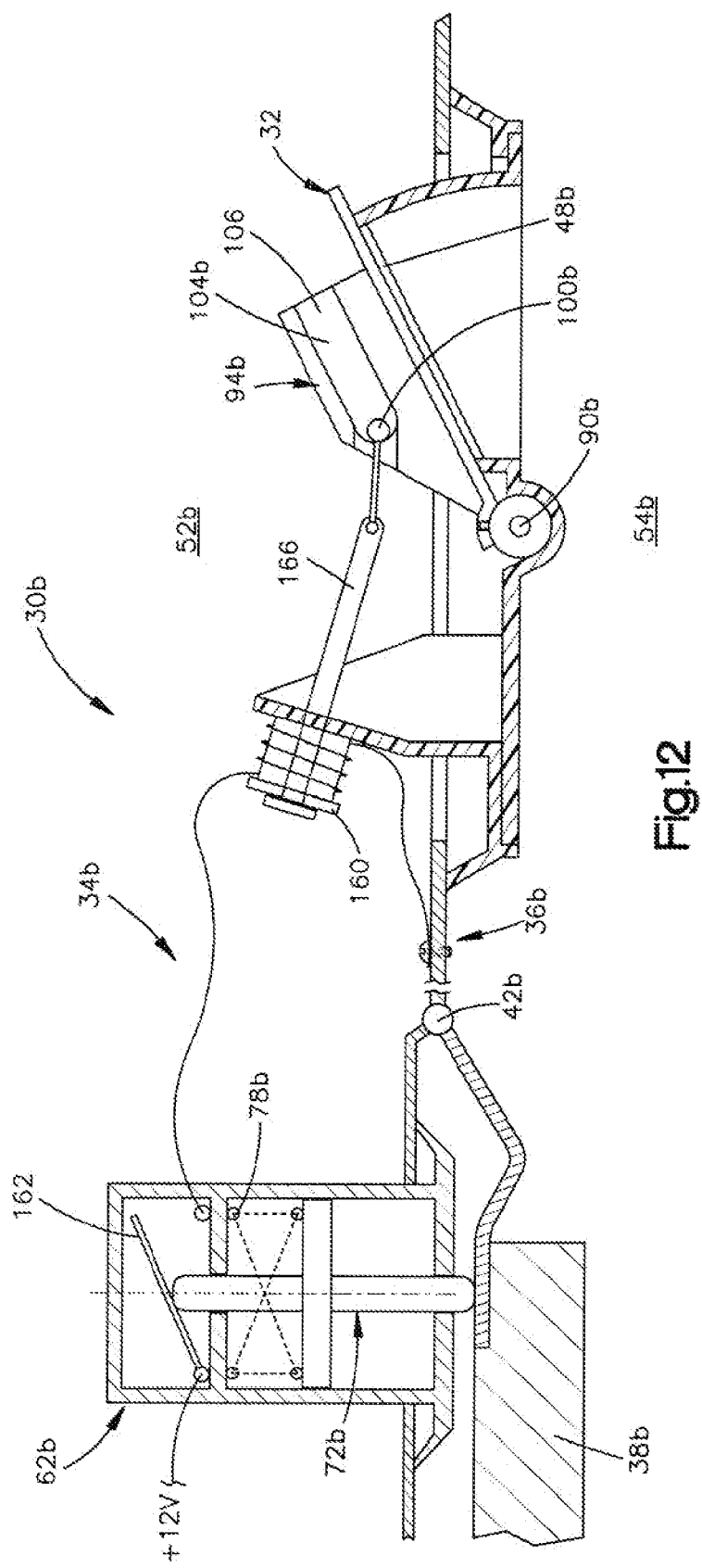
FIG. 12 is a schematic illustration, generally similar to FIG. 1, depicting an embodiment in which the vent valve is operated between open and closed conditions by an actuator assembly having electrical components.
Figure 13:
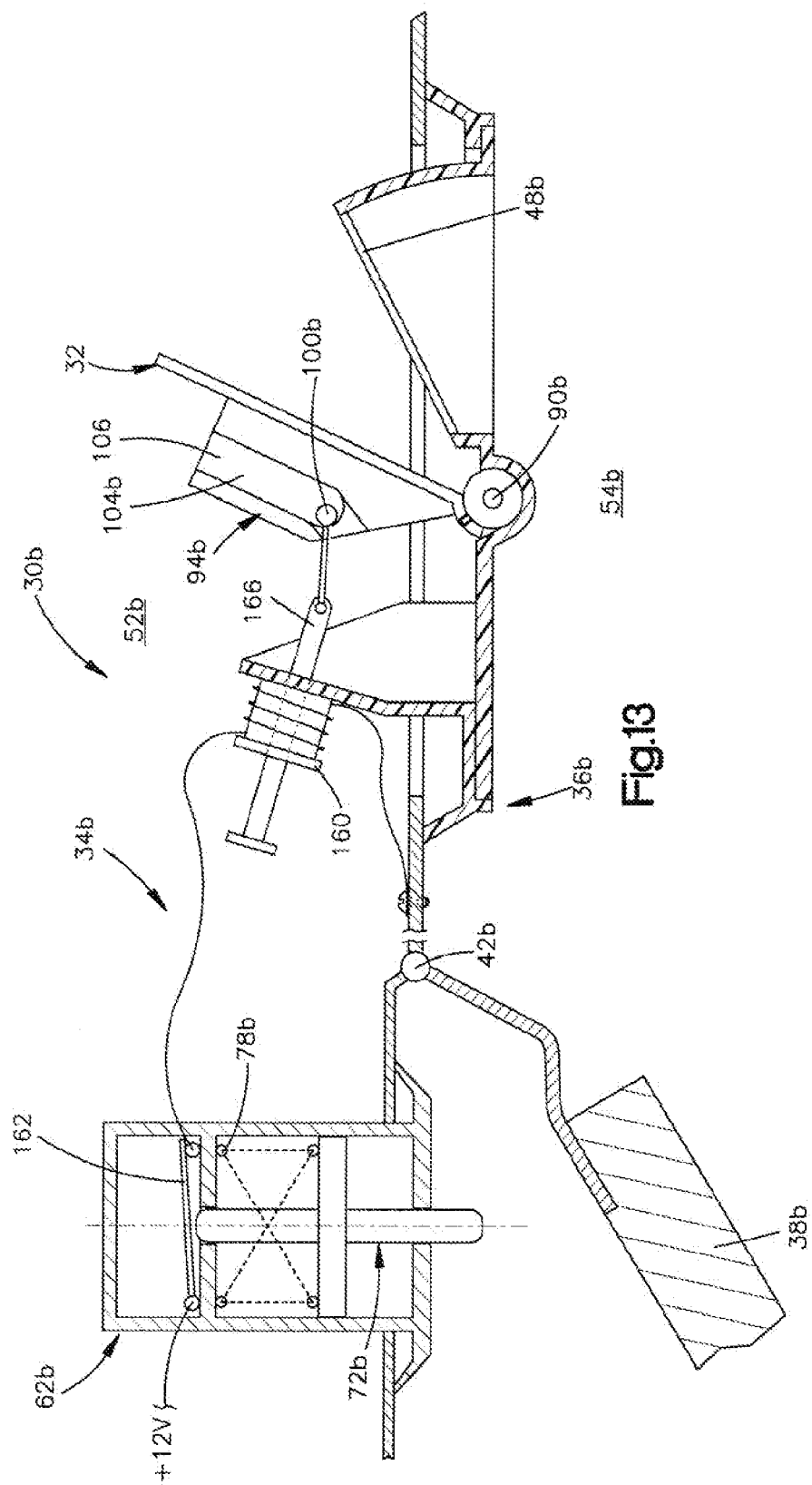
FIG. 13 is a schematic illustration, generally similar to FIG. 2, depicting the vent valve of the embodiment of FIG. 12 in an open condition.
Figure 14:
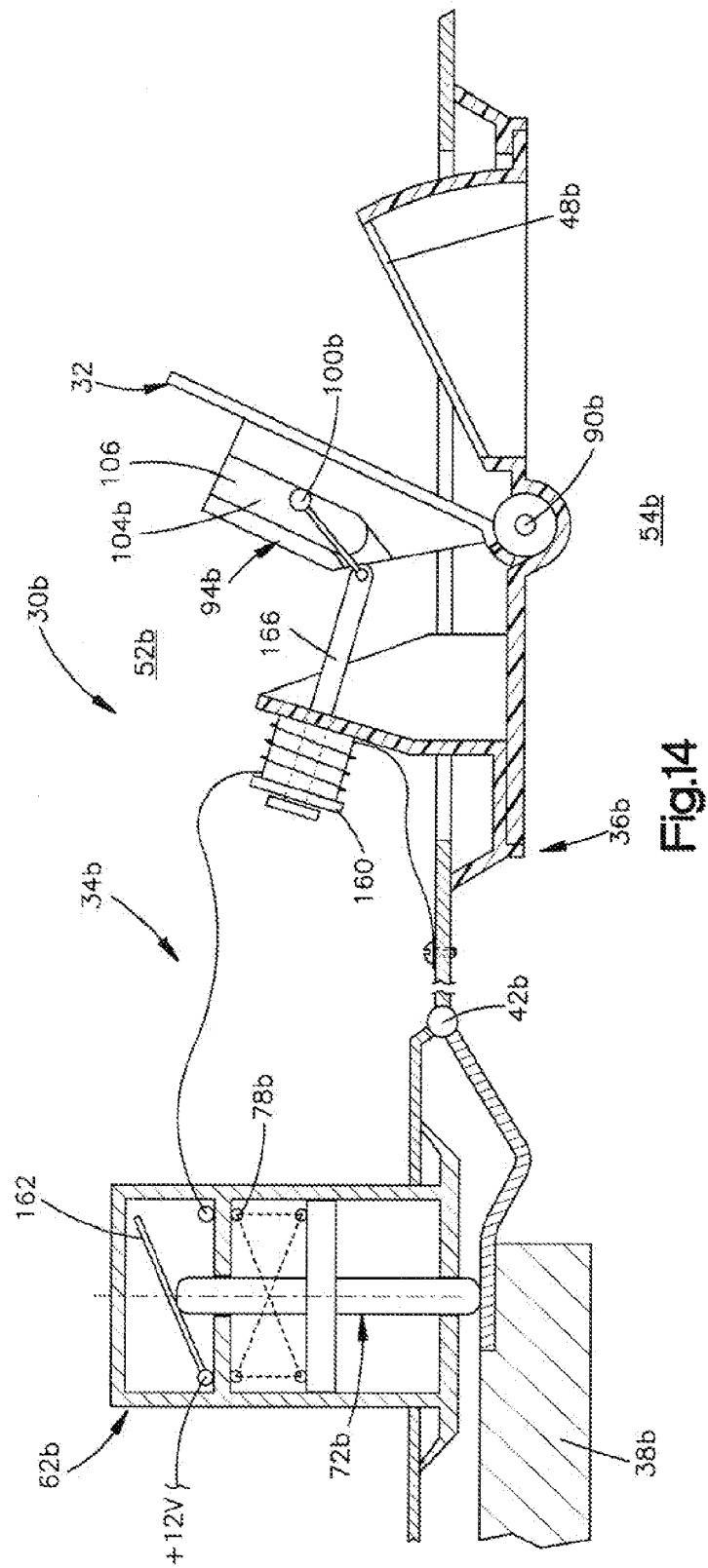
FIG. 14 is a schematic illustration, generally similar to FIG. 3, depicting the vent valve of the embodiment of FIGS. 12 and 13 in an open condition after a door of a vehicle has been closed.

Embodiment of FIGS. 12-14

In the embodiments of the invention illustrated in FIGS. 1-11, a mechanical actuator assembly is utilized in association with a door position sensor assembly and vent valve. In the embodiment of the invention illustrated in FIGS. 12-14, an actuator having electrical components is utilized in association with the door position sensor assembly and vent valve. Since the embodiment of the invention illustrated in FIGS. 12-14 is generally similar to the embodiments of the invention illustrated in FIGS. 1-11, similar numerals will be utilized to designate similar components, the suffix letter "b" being associated with the numerals of FIGS. 12-14 to avoid confusion.

The vent valve assembly 30b includes a vent valve 32b which is illustrated in a closed condition in FIG. 12 and an open condition in FIG. 13. An actuator assembly 34b connects the vent valve 32b with a door position sensor assembly 62b. The door position sensor assembly 62b is operated in response to movement of the door 38b from the closed position of FIG. 12 to the open position of FIG. 13. Upon movement of the door 38b from the closed position of FIG. 12 to the open position of FIG. 13, the actuator assembly 34b effects operation of the vent valve 32b from the closed condition of FIG. 12 to the open condition of FIG. 13.

Upon subsequent movement of the door 38b to the closed position of FIG. 14, the actuator assembly 34b releases of the vent valve 32b for movement from the fully open condition of FIG. 13 through the partially open condition of FIG. 14 to the closed condition of FIG. 12. A closing spring, corresponding to the closing spring 112 of FIGS. 4 and 8, is effective to cause movement of the vent valve 32b from the open condition of FIG. 13 through the partially open condition of FIG. 14 to the closed condition of FIG. 12. A friction damper, corresponding to the friction damper 132 of FIGS. 4 and 8, is provided in association with the vent valve 32b and hinge 90b in the same manner as was previously described in conjunction with the friction damper 132 of FIGS. 4 and 8. The friction damper delays operation of the vent valve 32b to the closed condition in the same manner as explained in conjunction with the embodiment of FIGS. 1-8.

In the embodiment of the invention illustrated in FIGS. 12-14, the actuator assembly 34b includes a solenoid 160 which is connected with the vent valve 32b by a slide connection 94b. When the vehicle door 38b is operated from the closed position of FIG. 12 to the open position of FIG. 13, the plunger 72b is moved downward (as viewed in FIGS. 12 and 13) by the biasing spring 78b. As this occurs, a switch 162 is operated from the open condition of FIG. 12 to the closed condition of FIG. 13. Closing the switch 162 completes a circuit to effect energization of the solenoid 160.

Energization of the solenoid 160 pulls an armature or force transmitting member 166 toward the left (as viewed in FIG. 12). This movement of the armature 166 transmits force through the slide connection 94b to the vent valve 32b and pivots the vent valve in a counterclockwise direction (as viewed in FIG. 12) about the hinge 90b. Pivotal movement of the vent valve 32b from the closed condition of FIG. 12 to the open condition of FIG. 13 in response to energization of the solenoid 160 and movement of the armature 166 is effective to open the vent opening 48b. Opening the vent opening 48b connects the passenger compartment 52b of the vehicle 36b in fluid communication with the trunk compartment and/or atmosphere 54b around the vehicle.

When the door 38b is subsequently moved from the open position of FIG. 13 back to the closed position of FIG. 14, the plunger 72b is retracted against the influence of the biasing spring 78b and the switch 162 is operated from the closed condition of FIG. 13 to the open condition of FIG. 14. Opening the switch 162 effects the deenergization of the solenoid 160. Deenergization of the solenoid 160 results in the armature 166 moving from the retracted position of FIG. 13 to the extended position of FIG. 14 due to the force applied by a closing spring that urges the vent valve 32b toward the closed condition. The head end section 100b moves along the slot 104b as the vent valve 32b moves to the closed condition. The armature 166 may be spring biased to move from the retracted position to the extended position.

The armature or force transmitting member 166 has a head end section 100b pivotally connected to the armature. The head end section 100b is connected with the vent valve 32b by the slide connection 94b which allows relative movement to occur between the armature 166 and vent valve 32b. The head end section 100b is received in a slot 104b of the vent valve 32b. The head end section 100b can slide along a longitudinal axis of the slot 104b. Thus, the force transmitting member 166 is movable relative to the vent valve 32b. This relative movement enables the vent valve 32b to remain in the open condition after the door 38b has moved to its closed condition.

A closing spring, corresponding to the closing spring 112 of FIG. 8, is effective to urge the vent valve 32b toward the closed condition. However, movement of the vent valve 32b toward the closed condition is delayed by a friction damper, corresponding to the friction damper 132 of FIGS. 4 and 8. Although the closing spring, corresponding to the closing spring 112 of FIGS. 4 and 8, is eventually effective to close the vent valve 32b against the influence of the friction damper, the vent valve 32b remains in a partially open condition long enough to prevent any significant rise in the pressure in the passenger compartment 52b of the vehicle 36b. The construction and mode of operation of the closing spring and friction damper connected with the vent valve 32b is the same as the construction and mode of operation of the closing spring 112 and friction damper 132 of the embodiment of the invention illustrated in FIGS. 1-8.

Figure 15:
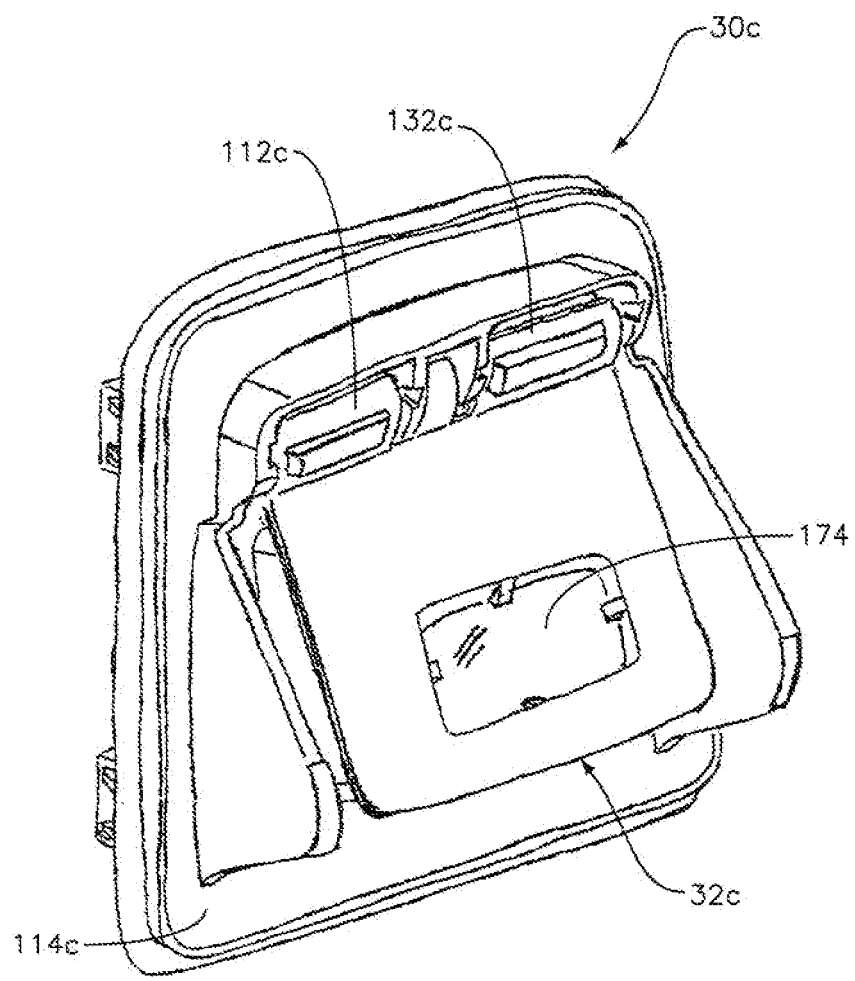
FIG. 15 is a schematic illustration of an embodiment in which a vent valve is urged to a closed condition by a magnet.
Figure 16:
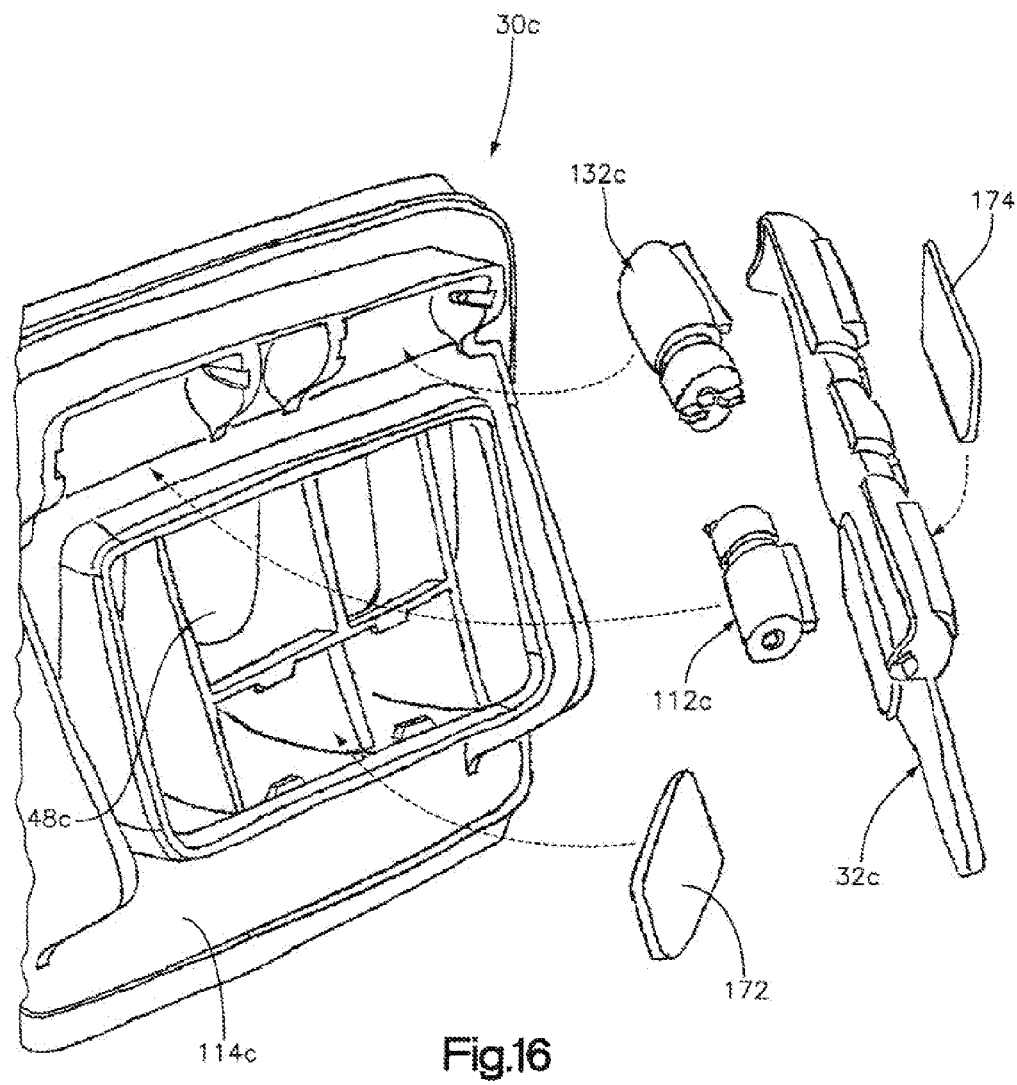
FIG. 16 is an exploded schematic illustration of the embodiment of FIG. 15, further illustrating the relationship between the vent valve, damper, closing spring, and magnet.

Embodiment of FIGS. 15 and 16

In the embodiment of the invention illustrated in FIGS. 1-14, the vent valve 32 is held in a closed condition under the influence of a closing spring, corresponding to the closing spring 112 of FIGS. 4 and 8. In the embodiment of the invention illustrated in FIGS. 15 and 16, the vent valve is held in the closed condition under the influence of the closing spring and a magnet. Since the embodiment of the invention illustrated in FIGS. 15 and 16 is generally similar to the embodiments of the invention illustrated in FIGS. 1-14, similar numerals will be utilized to designate similar components, the suffix letter "c" being associated with the numerals with the FIGS. 15 and 16.

A vent valve assembly 30c includes a vent valve 32c. The vent valve 32c is connected with a door position sensor assembly, corresponding to the door position sensor assembly 62 of FIGS. 1-3 by an actuator assembly, corresponding to the actuator assembly 34 of FIGS. 1-3. It should be understood that although the door position sensor assembly and actuator assembly 34 have not been illustrated in FIG. 15, the door position sensor assembly and actuator assembly may have any one of the constructions illustrated in FIGS. 1-14. It should also be understood that although a connection, corresponding to the slide connection 94 of FIGS. 1-3, has not been shown in association with the vent valve 32c, a connection corresponding to the slide connection 94 of FIGS. 1-3 is utilized to connect an actuator assembly with the vent valve assembly 32c. In addition, a closing spring 112c and friction damper 132c are provided in association with the vent valve 32c in the same manner as previously discussed in connection with the embodiment of the invention illustrated in FIGS. 1-8.

In accordance with a feature of this embodiment of the invention, a magnet 172 is mounted on the base 114c (FIG. 16) adjacent to the vent opening 48c. The magnet 172 cooperates with a piece 174 (FIG. 15) of magnetizable metal mounted on the vent valve 32c. The magnet 172 attracts the magnetizable metal (steel) on the vent valve 32c to hold the vent valve in the closed condition illustrated in FIG. 15.

The vent valve assembly 30c may include or not include a slide connection, the magnet 172, the friction damper 132c, the closing spring 112c and/or the piece 174. Accordingly, the vent valve assembly 30c may have a modular design.

Figure 17:
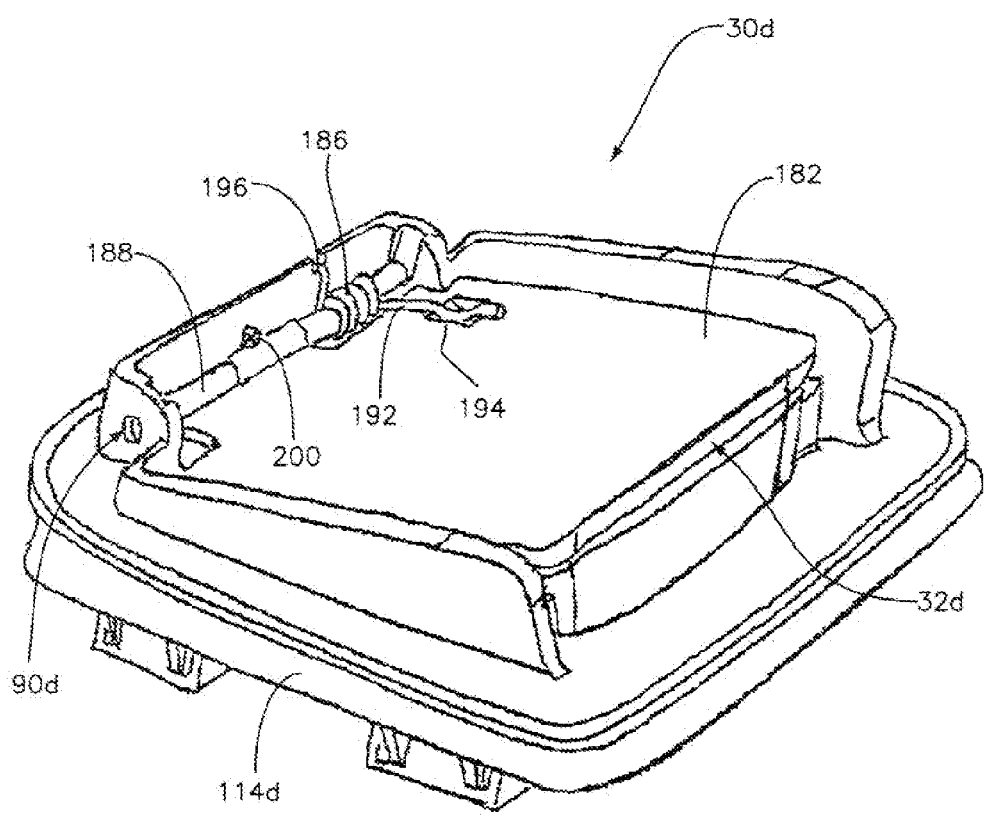
FIG. 17 is a schematic illustration of another embodiment and depicting the relationship between a vent valve, damper and closing spring.
Figure 18:
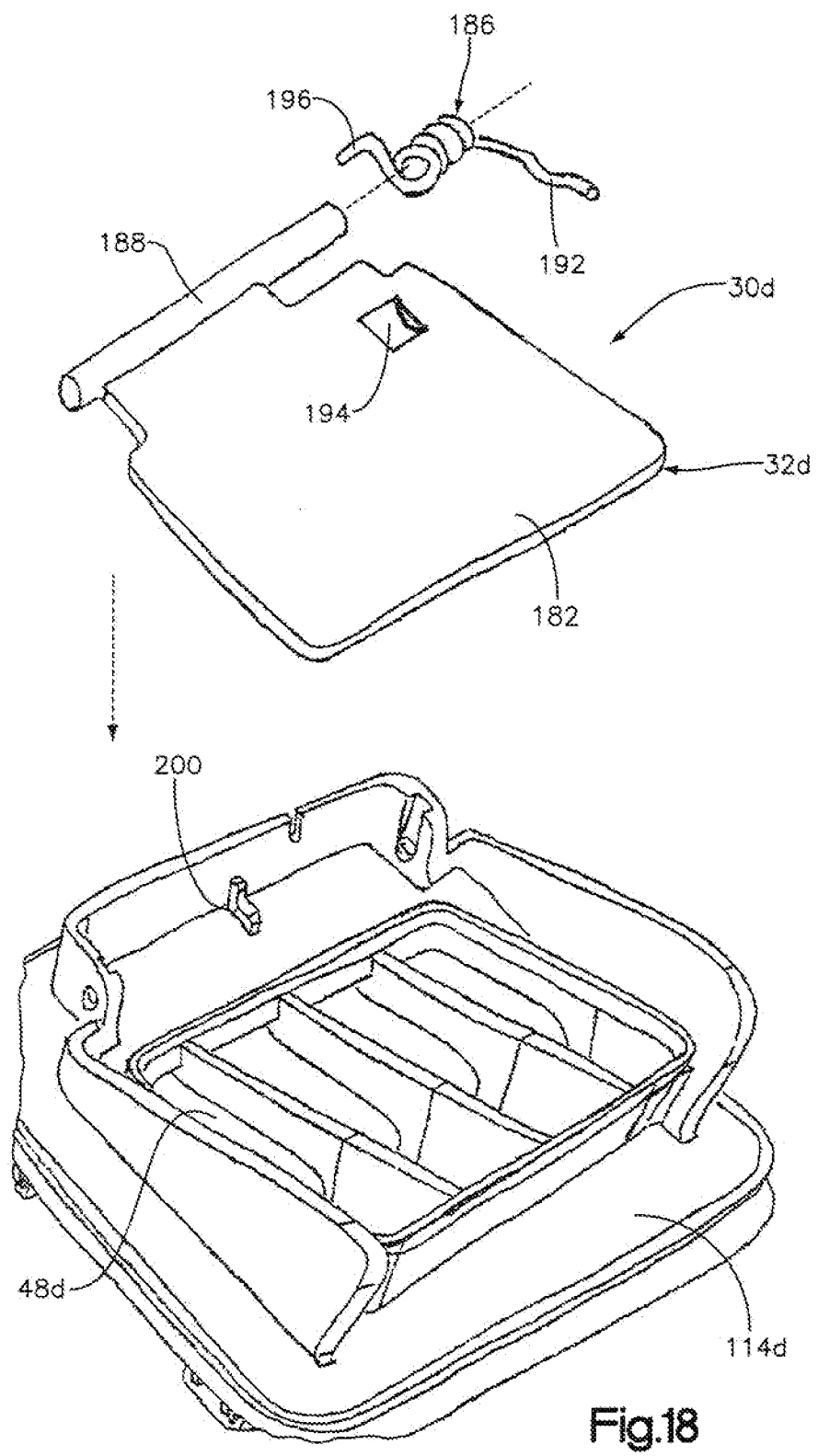
FIG. 18 is an exploded schematic illustration of the apparatus of FIG. 17.

Embodiment of FIGS. 17 and 18

In the embodiments of the invention illustrated in FIGS. 1-16, closing springs 112 and friction dampers 132, having the construction illustrated in FIGS. 4 and 8, are utilized in association with the vent valves 32. In the embodiment of the invention illustrated in FIGS. 17 and 18, a closing spring and friction damper having a different construction are utilized in association with the vent valve. Since the embodiment of the invention illustrated in FIGS. 17 and 18 is generally similar to the embodiments of the invention illustrated in FIGS. 1-16, similar numerals will be utilized to designate similar components, the suffix letter "d" being associated with the numerals of FIGS. 17 and 18 to avoid confusion.

A vent valve assembly 30d is utilized to prevent formation of excessive air pressure in the passenger compartment of a vehicle, corresponding to the vehicle 36 of FIGS. 1-3. The vent valve assembly 30d is connected with a door position sensor assembly, corresponding to the door position sensor assembly 62 of FIGS. 1-3, by an actuator assembly, corresponding to the actuator assembly 34 of FIGS. 1-3. Although only the vent valve 32d and base 114d have been illustrated schematically in FIG. 17, it should be understood that the vent valve 32d is connected with a door position sensor having a construction similar to the construction of a door position sensor 62 of FIGS. 1-3 by an actuator assembly having a construction similar to the construction of the actuator assembly 34 of FIGS. 1-3. It should also be understood that a slide connection having a construction similar to the construction of the slide connection 94 of FIGS. 1-3 is utilized to connect the actuator assembly with the vent valve 32d of FIG. 17. The vent valve 32d of FIG. 17 includes a flat valve member 182 (FIG. 18) which is pivotally mounted on the base 114d at a hinge 90d (FIG. 17).

In the embodiment of the invention illustrated in FIGS. 17 and 18, the closing spring is formed by a one piece spring 186 mounted on a shaft 188 of the valve member 182 (FIG. 18). The closing spring 186 has an outwardly extending arm section 192 which engages a recess 194 in the valve member 182 in the manner illustrated schematically in FIG. 17. In addition, the spring 186 has an arm section 196 which engages the base 114d (FIG. 17). The two arm sections 194 and 196 cooperate with the valve member 182 and base 114d to hold the vent valve 32d in the closed condition of FIG. 17. The closing spring 186 cooperates with the vent valve 32d to perform the same functions as the closing spring 112 of FIGS. 4 and 8.

Upon opening of a vehicle door, similar to the door 38 of FIG. 1, a door position sensor assembly effects operation of an actuator assembly to effect pivotal movement of the valve member 182 about a central axis of the shaft 188 at the hinge 90. When the vehicle door moves back to the closed position, in the manner illustrated schematically in FIG. 3, the closing spring 186 FIGS. 17 and 18 is effective to pivot the shaft 188 at the hinge 90d. However, pivotal movement of the shaft 188 and valve member 182 are resisted by a soft damper material 200 against which the shaft 188 is pressed. Friction force between the damper material 200 and the shaft 188 functions as a friction damper to delay movement of the valve member 182 under the influence of the closing spring 186.

In the embodiments of the invention illustrated in FIGS. 1-18, friction dampers have been utilized to delay movement of the vent valve to the closed condition after closing of a vehicle door. However, it is contemplated that other known types of dampers may be utilized if desired. For example, a pneumatic damper may be utilized. As another example, a hydraulic damper may be utilized.

The vent valve assembly 30d may include or not include a door position sensor assembly, spring 186, and/or the soft damper material 200. Accordingly, the vent valve assembly 30d may have a modular design.

Figure 19:
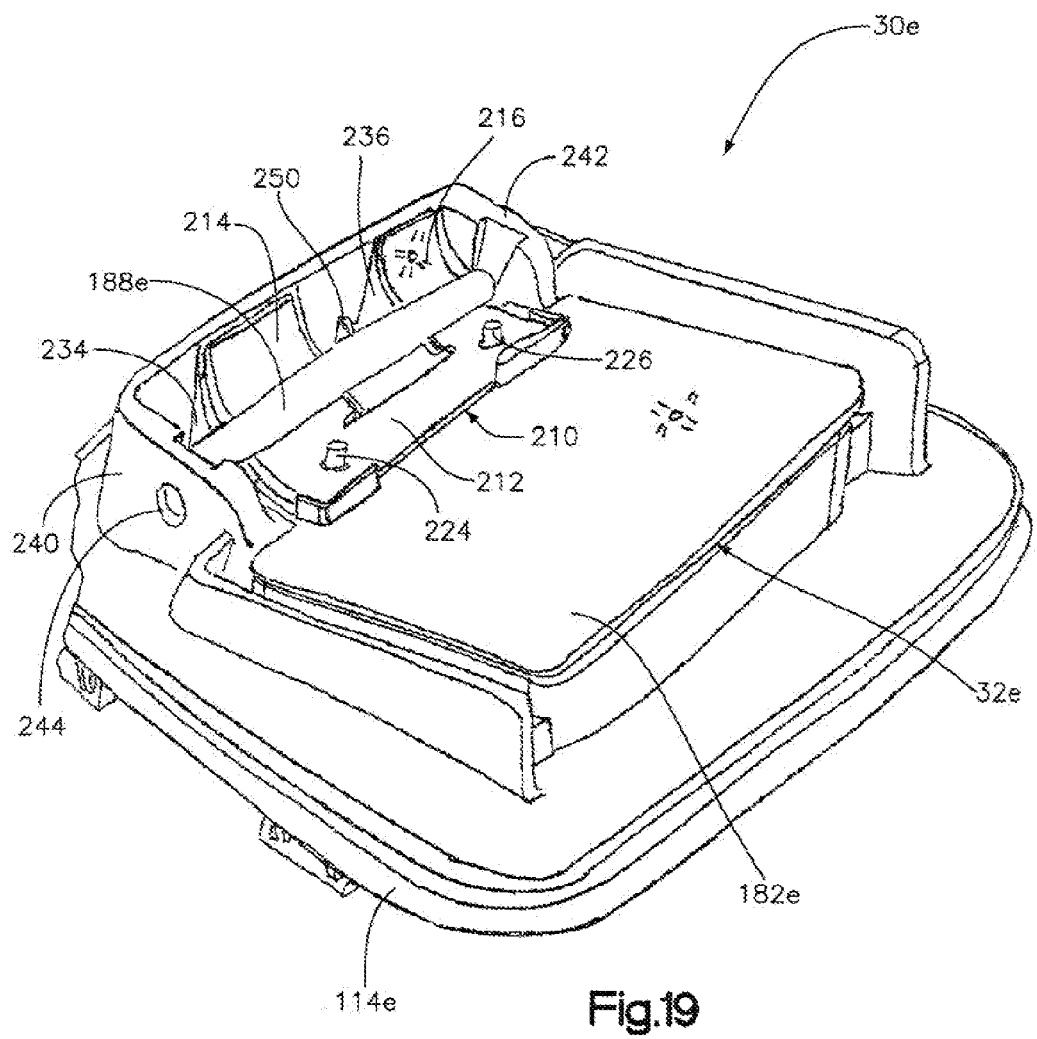
FIG. 19 is a schematic illustration, generally similar to FIG. 17, of another embodiment of the vent valve, damper and closing spring.
Figure 20:
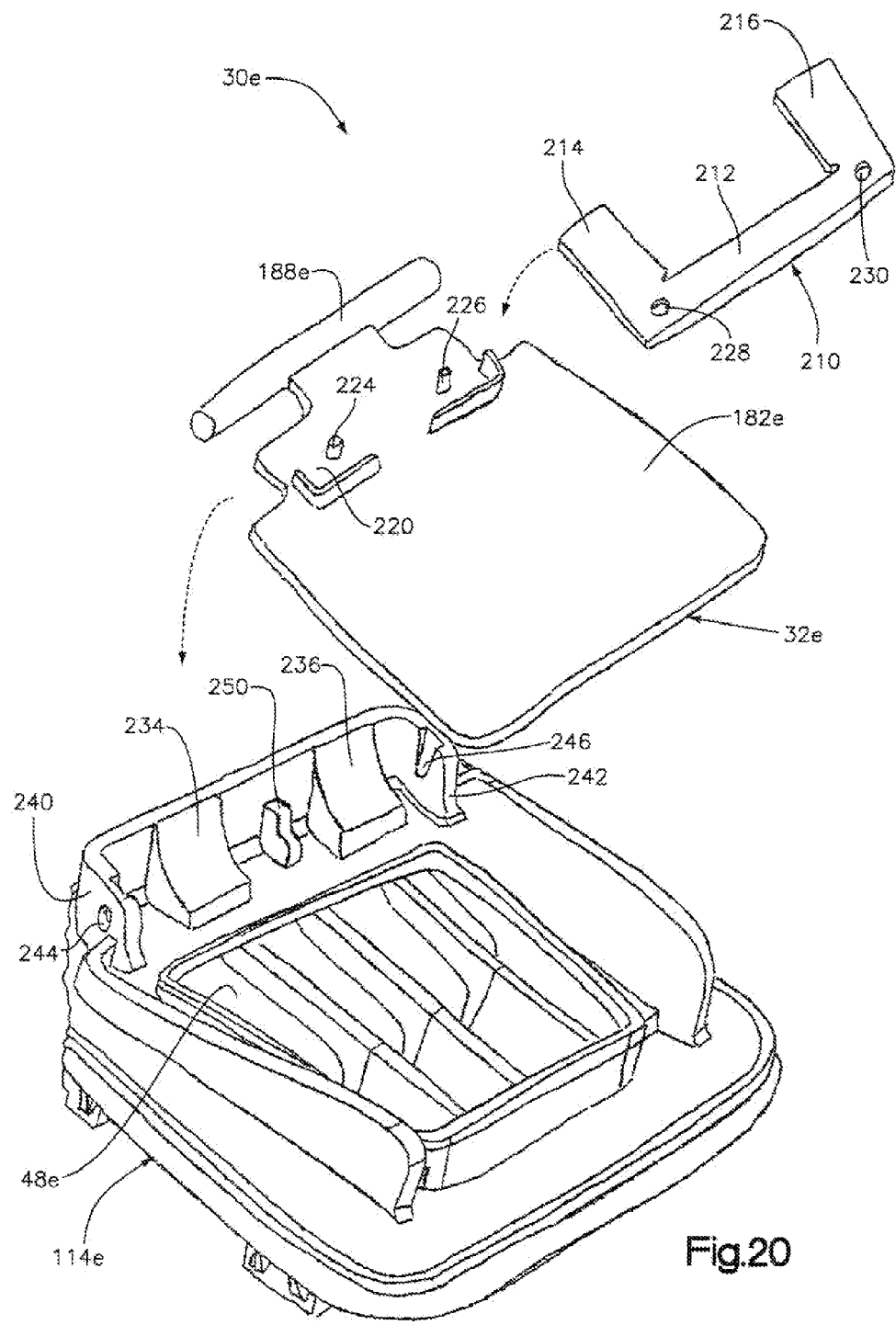
FIG. 20 is an exploded schematic illustration of the apparatus illustrated in FIG. 19.

Embodiment of FIGS. 19 and 20

In the embodiments of the invention illustrated in FIGS. 1-16, closing springs 112 and friction dampers 132 are associated with the vent valve 32 to urge the vent valve toward the closed condition and to delay movement of the vent valve to its closed condition. In the embodiment of the invention illustrated in FIGS. 19 and 20 a closing spring and damper having a different construction are illustrated. Since the embodiment of the invention illustrated in FIGS. 19 and 20 is generally similar to the embodiments of the invention illustrated in FIGS. 1-18, similar numerals will be utilized to designate similar components, the suffix letter "e" being associated with the numerals of FIGS. 19 and 20 to avoid confusion.

A vent valve assembly 30e includes a vent valve 32e. The vent valve 32e is connected with a door position sensor assembly, corresponding to the door position sensor assembly 62 of FIGS. 1-3, by an actuator assembly, corresponding to the actuator assembly 34. The actuator assembly is connected with the vent valve 32e by a slide connection, corresponding to the slide connection 94 of FIGS. 1-3.

The vent valve 32e (FIG. 20) includes a valve member 182e which is integrally formed as one piece with a shaft 188e. A closing spring, corresponding to the closing spring 112 of FIGS. 4 and 8 is formed by a metal leaf spring 210. The leaf spring 210 may be formed of a material other than metal. For example, the leaf spring 210 may be formed of a polymeric material.

The one piece leaf spring 210 includes a base section 212 and a pair of arm sections 214 and 216. The base section 212 (FIG. 20) is positioned in a recess 220 formed in the valve member 182e. A pair of pins or pegs 224 and 226 extend through openings 228 and 230 (FIG. 20) formed in the base section 212 of the leaf spring 210. The pins 224 and 226 cooperate with the openings 228 and 230 to position the leaf spring in the recess 220. The arm sections 214 and 216 extend under the shaft 188e and engage ramps 234 and 236 (FIG. 20) formed on the base 114e.

After the leaf spring 210 has been positioned in the recess 220 in the valve member 182e, the shaft 188e is snapped into support sections 240 and 242 on the base 114e. End portions of the shaft 188e are received in openings 244 and 246 formed in the support sections 240 and 242 (FIG. 20). The support sections 240 and 242 hold the shaft 188e against sideways movement relative to the base 114e while permitting the shaft to rotate relative to the base.

As the shaft 188e is snapped into the openings 244 and 246, the shaft is pressed firmly against a friction damper section 250. The friction damper section 250 is formed of a material which has a higher coefficient of friction than the surface of the shaft 188e and which retards rotation of the shaft relative to the base 114e. The friction damper section 250 cooperates with the shaft 188e to delay closing of the vent valve 32e in the same manner as in which the friction damper 132 delays closing of the vent valve 32 (FIGS. 4 and 8).

The vent valve 32e is connected with a door position sensor assembly, corresponding to the door position sensor assembly 62 of FIGS. 1-3, by an actuator assembly, corresponding to the actuator assembly 34 of FIGS. 1-3. The actuator assembly is connected with the vent valve 32e by a slide connection, corresponding to the slide connection 94 of FIGS. 1-3.

The vent valve assembly 30e may include or not include a door position sensor assembly, the leaf spring 210, and/or the soft material of the friction damper section 250. Accordingly, the vent valve assembly 30e may have a modular design.

From the above description of the invention, those skilled in the art will perceive improvements, changes and modifications. For example, the vent valve may have a configuration other than the illustrated configuration. Such improvements, changes and modifications within the skill of the art are intended to be covered by the appended claims.

Having described the invention, the following is claimed:

1. An apparatus which prevents objectionable increases in air pressure in a passenger compartment of a vehicle upon closing of a door of the vehicle, said apparatus comprising:
   a vent valve which is movable between a closed condition blocking air flow through a vent opening and an open condition enabling air to flow through the vent opening;
   a door position sensor assembly which is operable from a first condition to a second condition in response to movement of the door of the vehicle from a closed position to an open position, said door position sensor assembly being operable from the second condition to the first condition in response to movement of the door of the vehicle from the open position to the closed position; and
   an actuator assembly which is connected with said door position sensor assembly and said vent valve, said actuator assembly being operable to operate said vent valve from the closed condition to the open condition upon operation of said door position sensor assembly from the first condition to the second condition, said actuator assembly being operable to move relative to said vent valve to allow said vent valve to move from the open condition to the closed condition upon operation of said door position sensor assembly from the second condition to the first condition.

2. An apparatus as set forth in claim 1 wherein said door position sensor includes a plunger having a first position when the door is in the closed position and a second position when the door is in the open position and a spring biasing said plunger toward the second position.

3. An apparatus as set forth in claim 2 wherein said plunger engages the door when the door is in the closed position.

4. An apparatus as set forth in claim 1 wherein said actuator assembly includes a force transmitting member connected with said vent valve, said force transmitting member moving from a first position to a second position upon operation of said door position sensor assembly from the first condition to the second condition, said force transmitting member moving said vent valve from the closed condition to the open condition when said force transmitting member moves from the first position to the second position.

5. An apparatus as set forth in claim 4 wherein a first end section of said force transmitting member extends into a slot in said vent valve to provide a slide connection with said vent valve.

6. An apparatus as set forth in claim 5 wherein a first spring urges said force transmitting member to move said vent valve to the open condition.

7. An apparatus as set forth in claim 6 wherein a second spring urges said vent valve toward the closed condition.

8. An apparatus as set forth in claim 6 wherein said first spring urges a plunger of said door position sensor assembly toward a first condition.

9. An apparatus as set forth in claim 4 wherein a solenoid moves said force transmitting member from the first position to the second position to move said vent valve from the closed condition to the open condition upon operation of said door position sensor assembly from the first condition to the second condition.

10. An apparatus as set forth in claim 9 wherein said door position sensor assembly includes a switch that closes upon movement of said door position sensor assembly from the first condition to the second condition.

11. An apparatus as set forth in claim 4 wherein said force transmitting member includes first and second portions pivotally connected to each other.

12. An apparatus as set forth in claim 1 further including a damper which delays movement of said vent valve from the open condition to the closed condition for a period of time sufficient to enable air to be conducted from the passenger compartment of the vehicle after the vehicle door has closed.

13. An apparatus as set forth in claim 12, wherein said damper includes first and second portions movable relative to each other, said first portion being connected with a base and said second portion being connected with said vent valve, said second portion moving with said vent valve relative to said first portion and said base during movement of said vent valve relative to said base.

14. An apparatus as set forth in claim 13 wherein a friction member engages said first and second portions of said damper to resist relative movement between said first and second portions.

15. An apparatus as set forth in claim 14 wherein said first portion extends into an opening in said second portion, said first and second portions being coaxial and rotating relative to each other when said vent valve moves between the closed condition and the open condition.

16. An apparatus as set forth in claim 15 wherein said first and second portions are coaxial with a hinge of said vent valve.

17. An apparatus as set forth in claim 16 wherein an O-ring engages said first and second portions to resist relative rotation between said first and second portions.

18. An apparatus as set forth in claim 13 wherein said first portion is a shaft rotatable with said vent valve relative to said base, said second portion extending from said base into engagement with said shaft.

19. An apparatus as set forth in claim 1 wherein one of said vent valve and a base includes a magnet and the other of said vent valve and said base includes a magnetic material, said magnet applying a magnetic force to said magnetic material to move said vent valve relative to said base toward the closed condition.

20. An apparatus as set forth in claim 1 wherein a spring urges said vent valve toward the closed condition, said spring having a first portion engaging the vent valve and a second portion engaging a base.

21. An apparatus as set forth in claim 20 wherein said spring is a leaf spring.

22. An apparatus as set forth in claim 21 wherein said vent valve has pins extending through openings in the leaf spring.

23. An apparatus as set forth in claim 20 wherein said first portion of said spring extends into a recess in said vent valve.

24. An apparatus as set forth in claim 2, wherein the actuating assembly includes a force transmitting member secured to the plunger and the vent valve such that movement of the plunger from the first position to the second position pulls the force transmitting member such that the vent valve pivots from the closed condition to the open condition.

25. An apparatus as set forth in claim 24, wherein the force transmitting member is a flexible cable.

26. An apparatus as set forth in claim 2, wherein the force transmitting member moves with the vent valve to move the vent valve from the closed condition to the open condition, the force transmitting member moving relative to the vent valve to release the vent valve and allow the vent valve to move from the open condition to the closed condition.

27. An apparatus as set forth in claim 1, wherein the actuator assembly includes a force transmitting member having a first end section extending into a slot in the vent valve having a longitudinal axis, the first end section moving with the vent valve to move the vent valve from the closed condition to the open condition, the first end section sliding along the longitudinal axis of the slot relative to the vent valve to allow the vent valve to move from the open condition to the closed condition.

28. An apparatus which prevents objectionable increases in air pressure in a passenger compartment of a vehicle upon closing of a door of the vehicle, the apparatus comprising:
a vent valve movable between a closed condition blocking air flow through a vent opening and an open condition enabling air to flow through the vent opening, the vent valve including a slot extending along a longitudinal axis;
a door position sensor assembly operable from a first condition to a second condition in response to movement of the door of the vehicle from a closed position to an open position, the door position sensor assembly being operable from the second condition to the first condition in response to movement of the door of the vehicle from the open position to the closed position; and
an actuator assembly connected with the door position sensor assembly and including a force transmitting member with a first end section extending into the slot of the vent valve, the first end section moving in a first direction along the axis of the slot and operating the vent valve from the closed condition to the open condition upon operation of the door position sensor assembly from the first condition to the second condition, the first end section moving relative to the vent valve in a second direction along the axis of the slot opposite the first direction to release the vent valve for movement relative to the actuator assembly from the open condition to the closed condition upon operation of the door position sensor assembly from the second condition to the first condition.

* * * * *